(12) United States Patent
Toriyabe et al.

(10) Patent No.: US 10,599,961 B2
(45) Date of Patent: Mar. 24, 2020

(54) PRINT SYSTEM, PRINT APPARATUS, METHOD OF CONTROLLING A PRINT SYSTEM, METHOD OF CONTROLLING A PRINT APPARATUS, AND STORAGE MEDIUM THAT APPLY CALIBRATION DATA FOR IMAGE ADJUSTMENT BASED ON A RESULT OF A MEASUREMENT FOR A PRINT JOB

(71) Applicant: CANON KABUSHIKI KAISHA, Tokyo (JP)

(72) Inventors: Hiroyuki Toriyabe, Nagareyama (JP); Nobuhiro Kawamura, Nagareyama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/629,996

(22) Filed: Jun. 22, 2017

(65) Prior Publication Data

US 2018/0012113 A1    Jan. 11, 2018

(30) Foreign Application Priority Data

Jul. 7, 2016    (JP) .................................. 2016-135205

(51) Int. Cl.
*G01J 3/46* (2006.01)
*G01J 3/52* (2006.01)
(Continued)

(52) U.S. Cl.
CPC .......... *G06K 15/027* (2013.01); *G03G 15/50* (2013.01); *G03G 15/5062* (2013.01); *G06F 3/1204* (2013.01); *G06F 3/1208* (2013.01); *G06F 3/1254* (2013.01); *G06F 3/1259* (2013.01); *G06F 3/1285* (2013.01); (Continued)

(58) Field of Classification Search
USPC ...... 358/1.1–3.29, 1.11–1.18, 504, 505, 527, 358/406, 464
See application file for complete search history.

(56) References Cited

U.S. PATENT DOCUMENTS

| 6,859,291 B1 * | 2/2005 | Katoh | .................. H04N 1/6097 358/1.9 |
| 8,964,221 B2 | 2/2015 | Sato | |

(Continued)

FOREIGN PATENT DOCUMENTS

JP    2013-012828 A    1/2013

*Primary Examiner* — Marcellus J Augustin
(74) *Attorney, Agent, or Firm* — Venable LLP

(57) ABSTRACT

A print apparatus includes a measurement unit that measures an image printed on a sheet, and one or more processors that execute instructions to cause the print apparatus to function as a first determination unit that determines whether or not a print job received from an image processing apparatus is a print job serving as a measurement target to be measured by the measurement unit, a control unit that causes the measurement unit to measure the image on the sheet that has been printed according to the print job determined to be the measurement target, and that controls the sheet on which the image has been measured to discharge via the paper discharge outlet, and a first transmission unit that transmits a result of measurement performed under control of the control unit to the image processing apparatus.

21 Claims, 14 Drawing Sheets

(51) Int. Cl.
    *H04N 1/60*           (2006.01)
    *H04N 1/00*           (2006.01)
    *G06K 15/02*          (2006.01)
    *G03G 15/00*          (2006.01)
    *G06F 3/12*            (2006.01)
    *G06K 15/00*          (2006.01)

(52) U.S. Cl.
    CPC ....... *G06F 3/1294* (2013.01); *G06K 15/1822* (2013.01); *G06K 15/405* (2013.01); *H04N 1/00034* (2013.01); *H04N 1/00058* (2013.01); *H04N 1/603* (2013.01); *H04N 1/6005* (2013.01); *H04N 1/6055* (2013.01); *G06F 3/1256* (2013.01); *G06K 15/1886* (2013.01); *G06K 2215/0017* (2013.01)

(56) References Cited

U.S. PATENT DOCUMENTS

| | | | |
|---|---|---|---|
| 9,014,582 B2 | 4/2015 | Toriyabe | |
| 2008/0181646 A1* | 7/2008 | Yamada | G03G 15/167 399/72 |
| 2011/0176153 A1* | 7/2011 | Hoshino | H04N 1/603 358/1.9 |
| 2013/0135636 A1* | 5/2013 | Kosuge | G06K 15/027 358/1.9 |
| 2013/0258364 A1* | 10/2013 | Ito | H04N 1/603 358/1.9 |

* cited by examiner

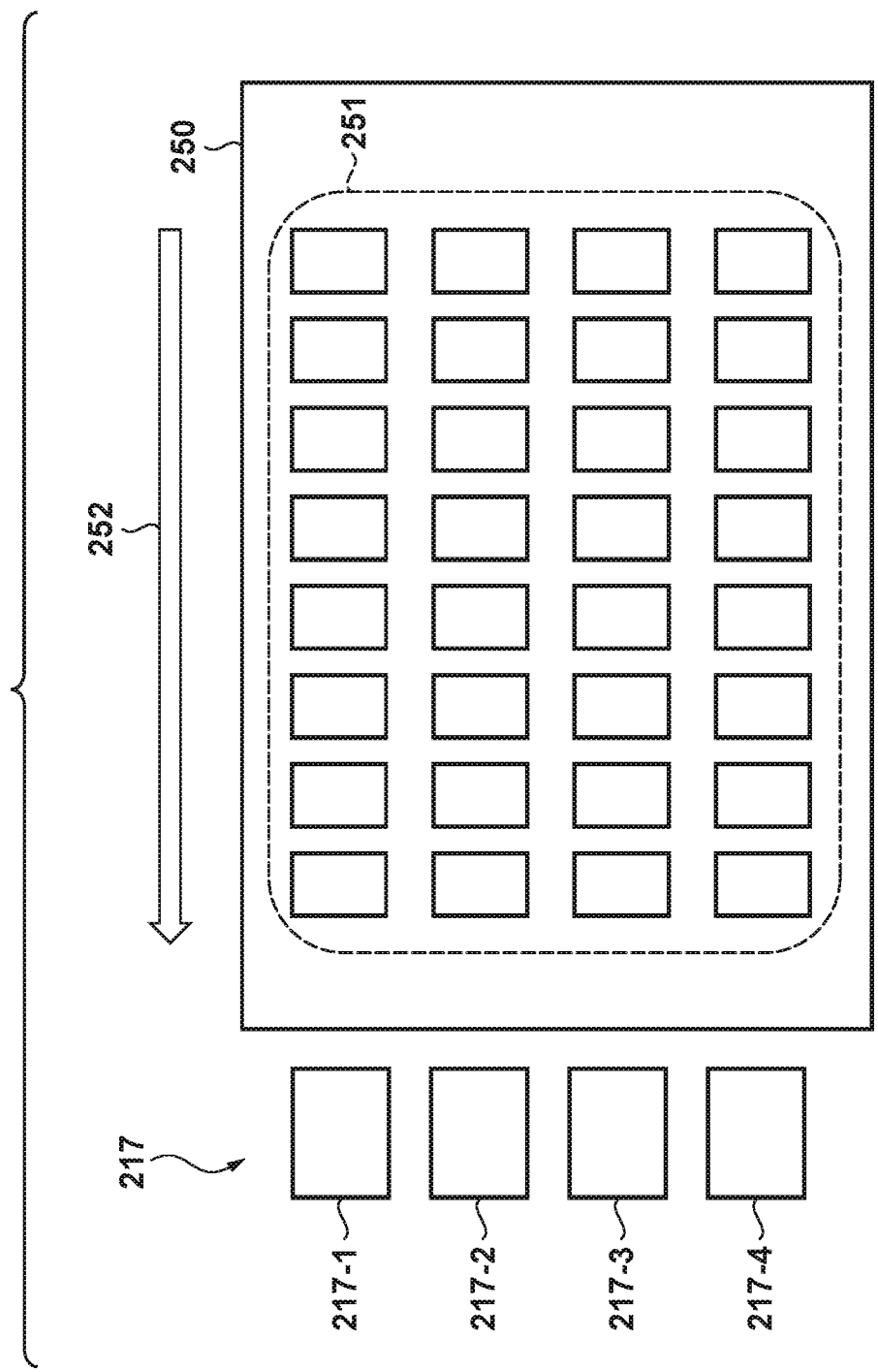

FIG. 7

| CHART TYPE ATTRIBUTE | IMAGE PROCESSING APPARATUS TYPE | IMAGE PROCESSING APPARATUS FUNCTION TYPE | REQUEST DATA TYPE | NUMBER OF MEASUREMENT PATCHES (PER SHEET, N = NUMBER OF SENSORS) |
|---|---|---|---|---|
| 01 | A | CALIBRATION | DENSITY | 19*N |
| 02 | A | COLOR PROFILE GENERATION | CHROMATICITY VALUES | 19*N |
| 03 | B | CALIBRATION | CHROMATICITY VALUES | 19*N |
| 04 | B | COLOR PROFILE GENERATION | CHROMATICITY VALUES | 25*N |
| 05 | B | VERIFICATION | CHROMATICITY VALUES | 25*N |

701 702 703 704 705

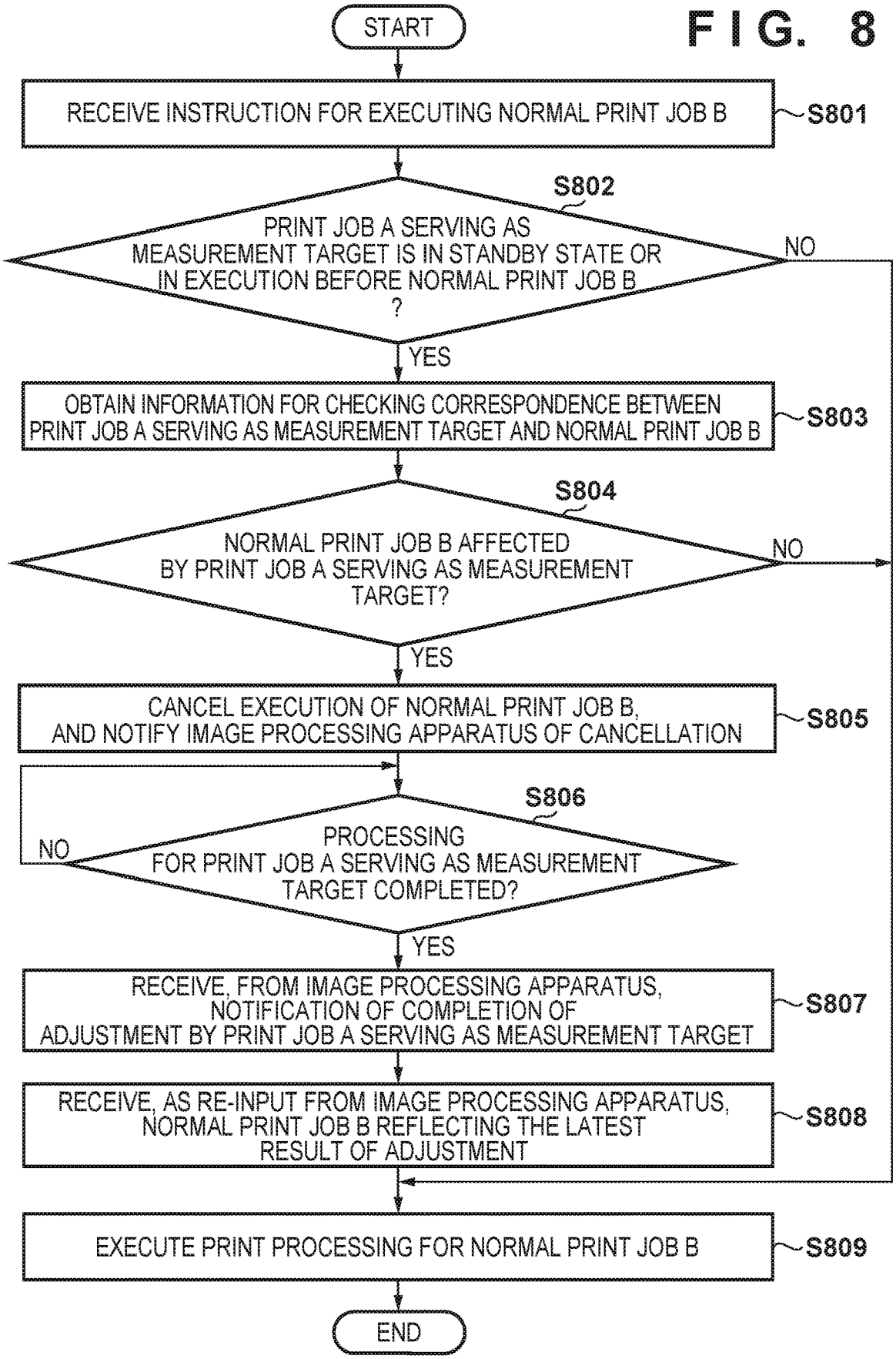

FIG. 9

| CALIBRATION SETTING NUMBER | CALIBRATION SETTING NAME | TYPE OF PAPER TO BE ADJUSTED |
|---|---|---|
| 00 | Plain | Plain,Thin |
| 01 | Heavy | Heavy1,Heavy2,TabPaper |
| 02 | Coated | Coated1,Coated2 |
| 03 | HeavyCoated | Coated3,Coated4 |
| 04 | Custom-A | User registered paper-A |
| 05 | Custom-B | User registered paper-B |

901　902　903

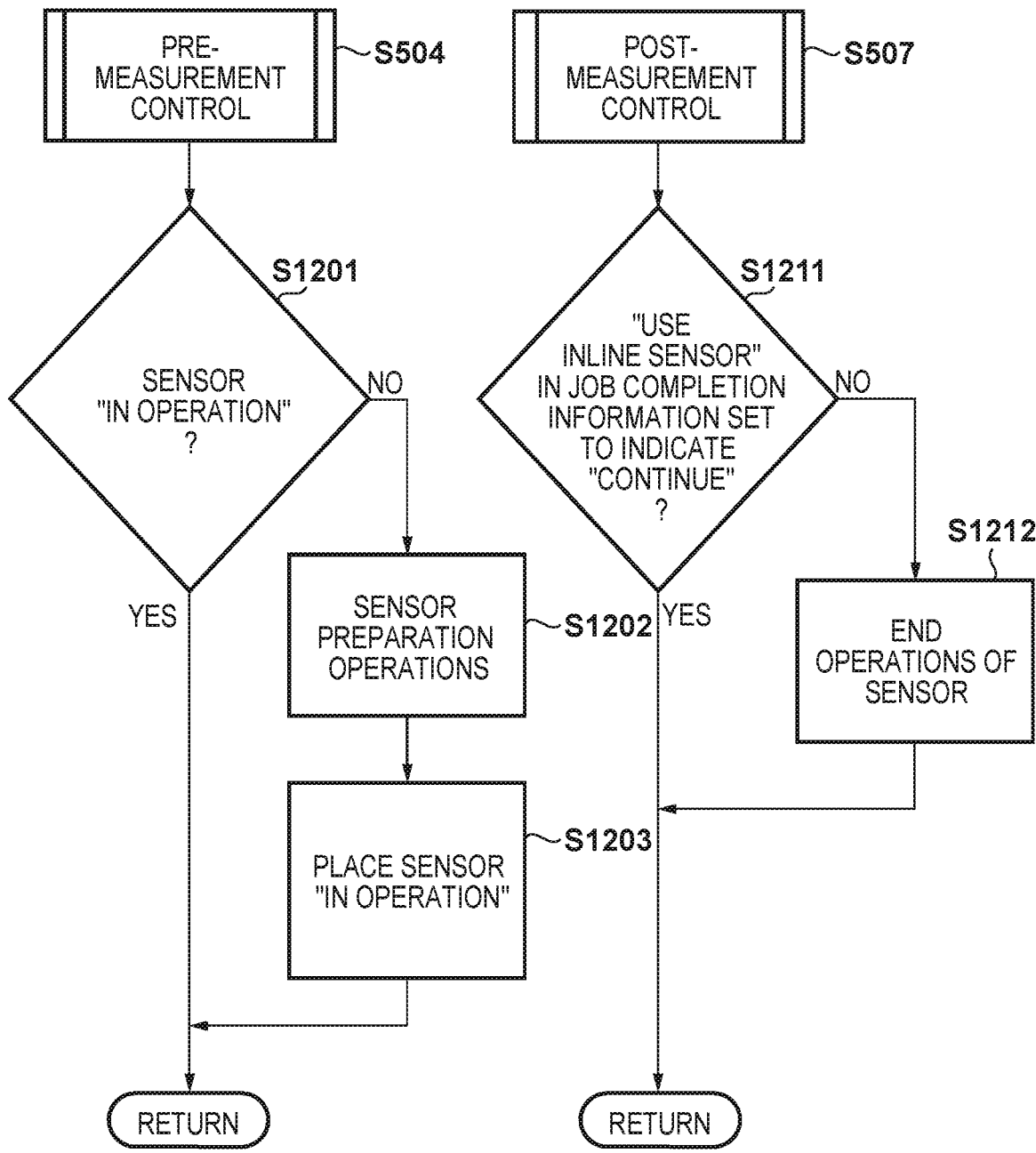

PRINT SYSTEM, PRINT APPARATUS, METHOD OF CONTROLLING A PRINT SYSTEM, METHOD OF CONTROLLING A PRINT APPARATUS, AND STORAGE MEDIUM THAT APPLY CALIBRATION DATA FOR IMAGE ADJUSTMENT BASED ON A RESULT OF A MEASUREMENT FOR A PRINT JOB

This application claims the benefit of Japanese Patent Application No. 2016-135205, filed Jul. 7, 2016, which is hereby incorporated by reference herein in its entirety.

BACKGROUND OF THE INVENTION

Field of the Invention

The present invention relates to a print system, a print apparatus, a method of controlling a print system, a method of controlling a print apparatus, and a storage medium that stores a program for controlling a print apparatus.

Description of the Related Art

In recent years, in a print system that is intended for commercial printing and includes an electrophotographic image forming apparatus, the image forming apparatus is generally used in combination with an image processing apparatus that is connected to the image forming apparatus for the purpose of improving added values. In such a print system, both the image forming apparatus and the image processing apparatus have an adjustment function (calibration function) that is intended to stabilize the image quality. The purpose of the adjustment function of the image forming apparatus is to optimize image forming conditions, such as a load voltage and a laser power. On the other hand, the purpose of the adjustment function of the image processing apparatus is to generate optimum image processing parameters in accordance with such conditions as paper used in printing. In such a print system, the adjustment function needs to be carried out in both the image forming apparatus and the image processing apparatus to stabilize the output image quality.

In recent image forming apparatuses, a sensor is arranged on a paper conveyance path that is located downstream relative to a fixing unit, and the sensor can measure the image quality of an image fixed on paper between when the image is fixed on the paper and when the paper is discharged to the outside of the apparatuses. This can automate a chart measurement process of the adjustment function of the image forming apparatuses.

Today, there is demand for automation of both the adjustment function of an image forming apparatus and the adjustment function of an image processing apparatus with the use of the aforementioned sensor to reduce a work load on an operator who carries out the adjustment functions in a print system.

For example, Japanese Patent Laid-Open No. 2013-12828 describes a technique to adjust a plurality of apparatuses using a measurement apparatus included in one apparatus. According to this document, a measurement chart printed by an image forming apparatus that does not include the measurement apparatus is fed to an image forming apparatus that includes the measurement apparatus. Then, the image forming apparatus that includes the measurement apparatus measures the fed measurement chart using the measurement apparatus included therein, thereby making it possible to carry out the adjustment function of the image forming apparatus that does not include the measurement apparatus using the result of the measurement.

As stated earlier, a print system intended for commercial printing includes an image forming apparatus and an image processing apparatus, and there is demand for automation of both the adjustment function of the image forming apparatus and the adjustment function of the image processing apparatus. According to the technique described in the aforementioned document, however, the premise is that image forming apparatuses with a print function operate in coordination with one another. The image forming apparatus that does not include a measurement apparatus prints a chart for adjustment, and the image forming apparatus that includes the measurement apparatus executes processing for measuring the chart. Therefore, this technique is not designed to adjust the adjustment function of an image processing apparatus that does not have a print function.

SUMMARY OF THE INVENTION

An aspect of the present invention is to eliminate the above-mentioned problem with the conventional technique.

A feature of the present invention is to automate the adjustment functions of a print apparatus and an image processing apparatus that supplies image data to the print apparatus.

According to a first aspect, the present invention provides a print system including an image processing apparatus and a print apparatus that receives a print job processed by the image processing apparatus and prints an image on a sheet, the print apparatus comprising a memory storing a set of instructions, and one or more processors that execute instructions of the set of the instructions and cause the print apparatus to function as a measurement unit configured to measure an image printed on a sheet, a first determination unit configured to determine whether or not a print job received from the image processing apparatus is a print job serving as a measurement target to be measured by the measurement unit, a control unit configured to cause the measurement unit to measure the image on the sheet, the image on the sheet having been printed by executing a print job that has been determined as the print job serving as the measurement target by the first determination unit, and a first transmission unit configured to transmit a result of measurement performed under control of the control unit to the image processing apparatus, the image processing apparatus comprising a memory storing a set of instructions, and one or more processors that execute instructions of the set of the instructions and cause the image processing apparatus to function as a generation unit configured to generate the print job serving as the measurement target, a second transmission unit configured to transmit the print job serving as the measurement target to the print apparatus, and an application unit configured to, upon receiving the result of measurement transmitted by the first transmission unit, apply the result of measurement to a print job to be printed by the print apparatus.

According to a second aspect, the present invention provides a print apparatus that receives a print job processed by an image processing apparatus and prints an image on a sheet, the print apparatus comprising a memory storing a set of instructions, and one or more processors that execute instructions of the set of the instructions and cause the print apparatus to function as a measurement unit configured to measure an image printed on a sheet, a determination unit configured to determine whether or not a print job received from the image processing apparatus is a print job serving as a measurement target to be measured by the measurement unit, a control unit configured to cause the measurement unit to measure the image on the sheet, the image on the sheet having been printed by executing a print job that has been determined as the print job serving as the measurement target by the determination unit, and a transmission unit configured to transmit a result of measurement performed under control of the control unit to the image processing apparatus.

Further features of the present invention will become apparent from the following description of exemplary embodiments with reference to the attached drawings.

BRIEF DESCRIPTION OF THE DRAWINGS

The accompanying drawings are incorporated in and constitute a part of the specification, illustrate embodiments of the invention, and, together with the description, serve to explain the principles of the invention.

FIG. 2 is a diagram for describing reading of patches on a chart by a sensor according to the first embodiment.

FIG. 7 depicts a view illustrating an example of a chart type information table according to the second embodiment.

FIG. 8 is a flowchart for describing processing executed by the image forming apparatus according to the third embodiment.

FIG. 9 depicts a view illustrating an example of a calibration setting table according to the embodiments.

FIG. 12A is a flowchart for describing pre-measurement sensor preparation operations that are performed by the image forming apparatus according to the fourth embodiment in step S504 of FIG. 5A.

FIG. 12B is a flowchart for describing control that is performed by the image forming apparatus according to the fourth embodiment in step S507 of FIG. 5A after performing printing for a print job serving as a measurement target.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

First, a description of a first embodiment will be provided.

Figure 1:
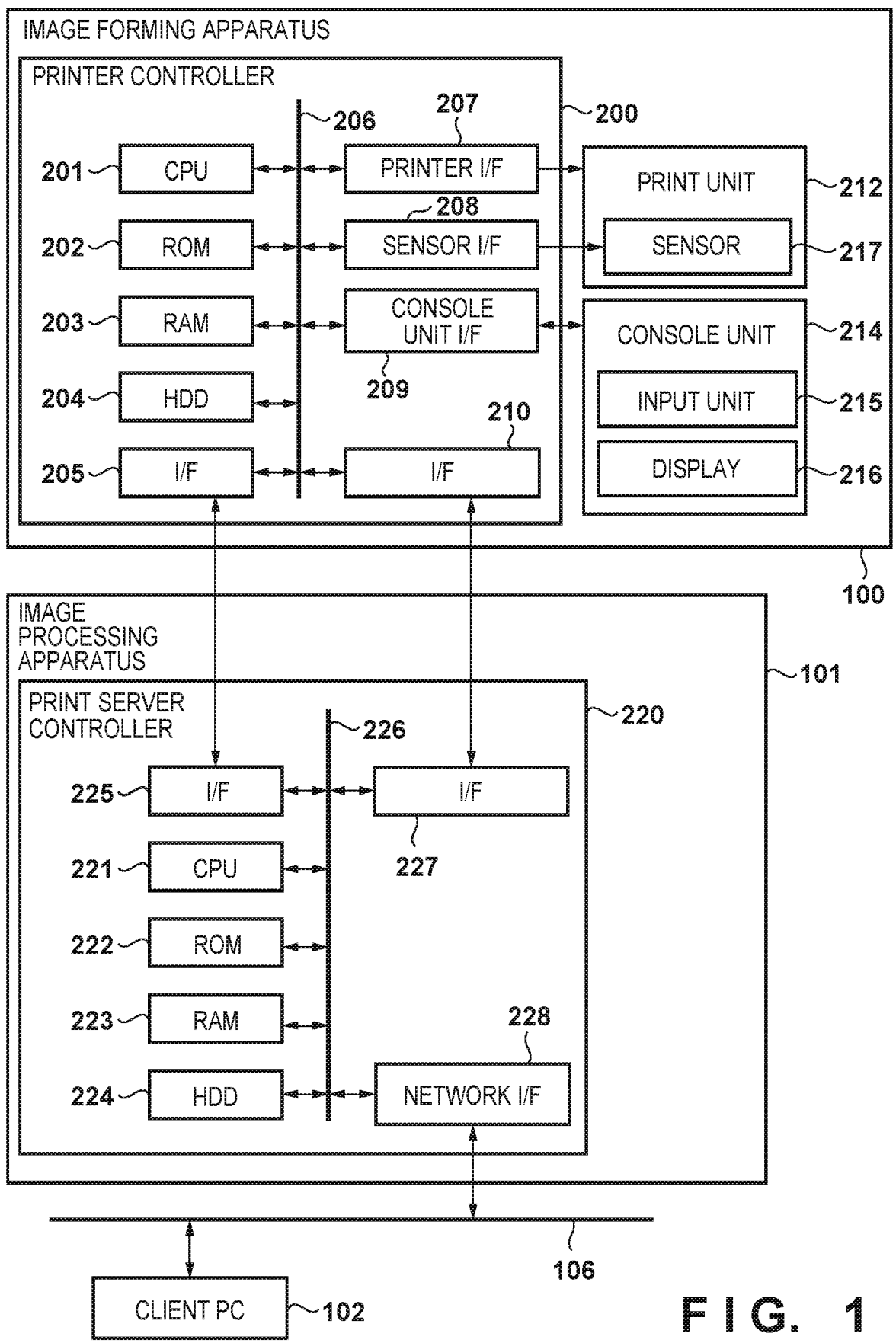
FIG. 1 is a block diagram for describing a configuration of a print system according to a first embodiment.

FIG. 1 is a block diagram for describing a configuration of a print system according to the first embodiment.

This print system includes an image forming apparatus (print apparatus) 100, an image processing apparatus 101, and a client PC 102. In the image forming apparatus 100, a printer controller 200 is a control unit for the image forming apparatus 100. A Central Processing Unit (CPU) 201 deploys control programs and an Operating System (OS) stored in a Read-Only Memory (ROM) 202 or a hard disk drive (HDD) 204 into a Random Access Memory (RAM) 203, and performs overall control of various types of devices connected to a system bus 206 based on the deployed programs. The ROM 202 stores, for example, the control programs that can be executed by the CPU 201. The RAM 203 mainly functions as, for example, a main memory and a working area for the CPU 201, and is configured such that its memory capacity can be expanded by an optional RAM connected to a non-illustrated expansion port. The HDD 204 stores, for example, the control programs, various types of applications, font data, user files, and files for editing. Although the first embodiment uses the HDD 204, the first embodiment is not limited to using the HDD 204, and may use a Secure Digital (SD) card, a flash memory, and the like, as an external storage apparatus. An interface (I/F) 205 receives information necessary for print control from the image processing apparatus 101. A printer I/F 207 controls outputting of image data to a print unit 212. A console unit I/F 209 controls display operations performed by a display 216 included in a console unit 214, and controls inputting of, for example, various types of setting information configured via an input unit 215. An I/F 210 receives, from the image processing apparatus 101, image data to be transmitted to the print unit 212. A sensor I/F 208 transmits an operation instruction for a sensor 217 included in the print unit 212, and receives the result of measurement performed by the sensor 217. The sensor 217 will be described later.

A configuration of the image processing apparatus 101 will now be described.

A print server controller 220 executes processing for analyzing an input print job, deployment processing for creating image data, and the like, that are necessary for executing print processing. A CPU 221 performs overall control of access to various types of devices connected to a system bus 226 by deploying control programs stored in a ROM 222 or a hard disk drive (HDD) 224 into a RAM 223 and executing the deployed programs. The ROM 222 stores, for example, the control programs that can be executed by the CPU 221. The RAM 223 mainly functions as, for example, a main memory and a working area for the CPU 221, and is configured such that its memory capacity can be expanded by an optional RAM connected to a non-illustrated expansion port. The hard disk (HDD) 224 stores, for example, a boot program, various types of applications, font data, user files, and files for editing. Although the first embodiment uses the HDD 224, the first embodiment is not limited to using the HDD 224, and may use an SD card, a flash memory, and the like, as an external storage apparatus. An I/F 225 transmits information necessary for print control to the image forming apparatus 100. An I/F 227 transmits, to the image forming apparatus 100, image data to be printed by the print unit 212 of the image forming apparatus 100. A network I/F 228 performs data communication with a network 106 via a network cable.

The client PC 102 is connected to the image processing apparatus 101 via the network 106. The client PC 102 inputs a print job to the image processing apparatus 101.

FIG. 2 is a diagram for describing reading of patches on a chart by the sensor 217 according to the first embodiment.

The sensor 217 is, for example, an inline spectral sensor, and is placed on a paper conveyance path between a non-illustrated fixing device of the print unit 212 and a paper discharge outlet. The sensor 217 needs to be fixed in place on the paper conveyance path. Thus, when increasing an amount of data to be read from a chart 250, it is necessary to increase the amount of data in a conveyance direction 252 of the chart. As simply doing so does not provide a sufficient amount of data to be read from one sheet of paper, however, a plurality of sensors 217-1 to 217-4 are arranged in a direction perpendicular to the conveyance direction 252 of the chart 250. FIG. 2 shows an example in which four sensors 217-1 to 217-4 are placed, and patch images 251 are arranged on the chart 250 in correspondence with the positions at which the sensors 217-1 to 217-4 are fixed in place.

The print unit 212 forms the chart 250 by printing the patch images 251 on the sheet. Thereafter, when the patch images 251 pass the sensors 217-1 to 217-4 along with the conveyance of the chart 250, the sensors measure the patches. At this time, one sensor measures a patch that passes immediately therebelow among the patch images 251 arranged on the chart 250. The result of the measurement performed by the sensors is transmitted to the printer controller 200 via the sensor I/F 208.

Figure 3A:
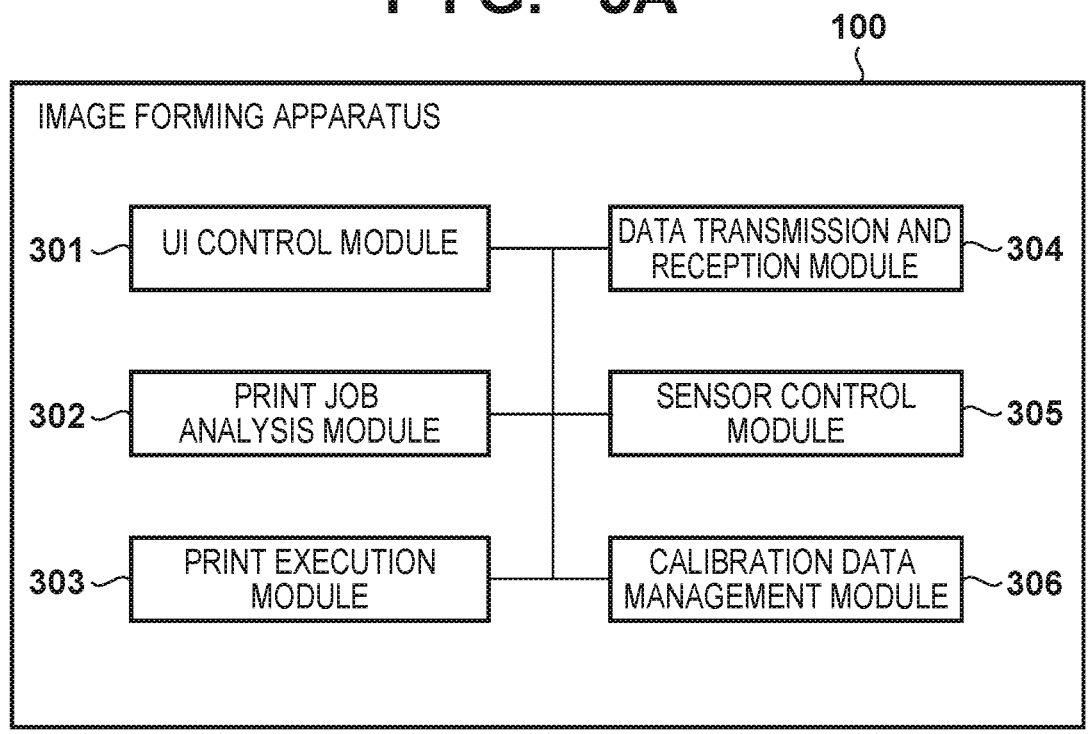
FIG. 3A is a block diagram for describing software modules of an image forming apparatus according to the first embodiment.

Examples of data yielded by the measurement performed by the sensor 217 include spectral values, chromaticity values, and densities. The first embodiment introduces an example in which the sensor 217 is a spectral sensor that can obtain chromaticity values (L*, a*, and b* values) that are device-independent color space values. The sensor 217 requires predetermined preparation operations before performing the measurement. For example, the printer controller 200 makes a connection confirmation, that is, confirms whether a normal connection is established between the sensor 217 and the sensor I/F 208. Furthermore, in order to detect an abnormality in a reading operation of the sensor 217, the printer controller 200 measures a non-illustrated white reference plate that is located near the sensor 217, and confirms whether the measured value falls within a certain reference range. If the printer controller 200 detects a defect in at least one sensor in these confirmation processes, it performs control under the assumption that all sensors 217-1 to 217-4 are unusable. In this case, the image forming apparatus 100 transmits information related to the defect in the sensor 217 to the image processing apparatus 101 via a data transmission and reception module 304 (FIG. 3A). Upon being notified of this defect, the image processing apparatus 101 controls various types of functions under the assumption that the sensor 217 is unusable. For example, a User Interface (UI) control module 311 (FIG. 3B) controls content displayed on a UI presenting a setting screen for a calibration function so as to disable selection of the sensor 217 of the image forming apparatus 100 as measurement apparatuses that measure the chart for adjustment.

Figure 3B:
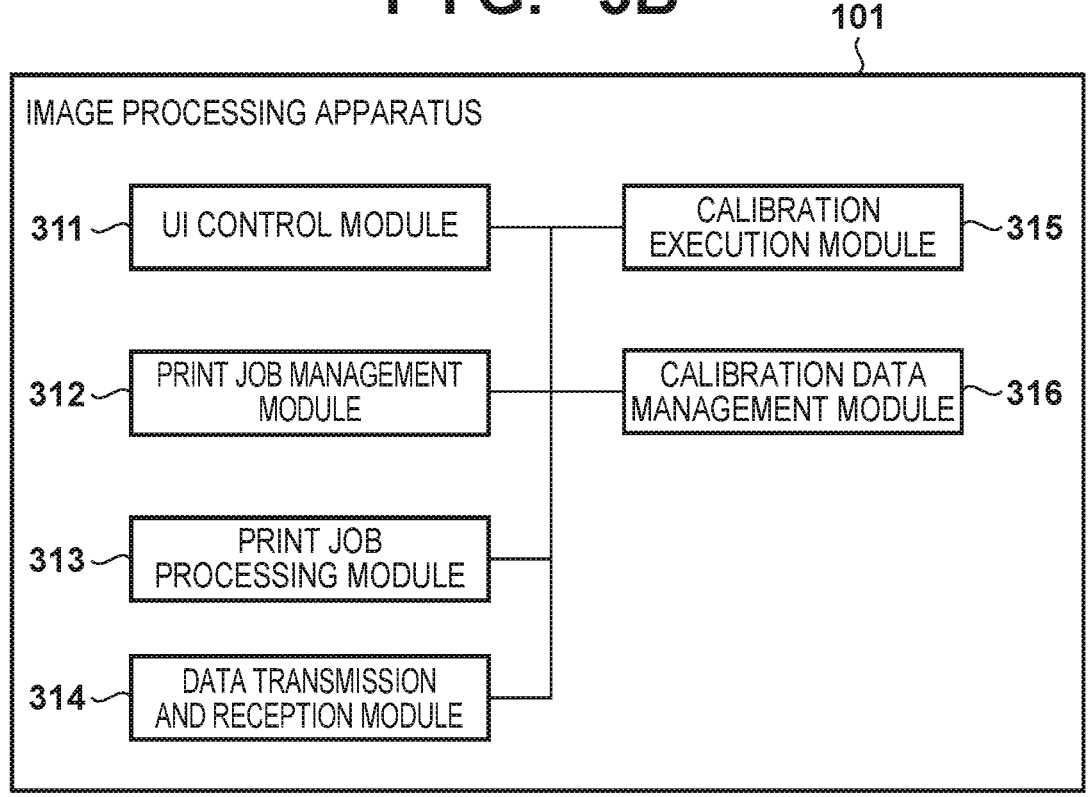
FIG. 3B is a block diagram illustrating software modules of an image processing apparatus according to the first embodiment.

FIGS. 3A and 3B are block diagrams for describing a software configuration of the print system according to the first embodiment.

FIG. 3A is a block diagram for describing software modules of the image forming apparatus 100 according to the first embodiment. These software modules are stored in the HDD 204 as programs, and the CPU 201 deploys these programs into the RAM 203 and executes the deployed programs.

A UI control module 301 controls display operations performed by the display 216 via the console unit I/F 209, and controls inputting of various types of setting information configured via the input unit 215. A print job analysis module 302 analyzes data of a print job received from the image processing apparatus 101. A print execution module 303 controls a series of print operations that are performed for a print job, such as paper feeding, paper conveyance, printing, and paper discharge. The data transmission and reception module 304 controls data transmission to and data reception from the image processing apparatus 101. Examples of transmitted and received data include data of a print job, the result of measurement performed by the sensor 217, and a later-described calibration setting table (FIG. 9) of the image processing apparatus 101. A sensor control module 305 controls measurement that is performed using the sensor 217, and measurement preparation operations. The sensor control module 305 also transmits the result of measurement performed by the sensor 217 to the data transmission and reception module 304. A calibration data management module 306 manages calibration data of the image processing apparatus 101 received by the data transmission and reception module 304. It also performs control that makes use of calibration data, as will be described later.

FIG. 3B is a block diagram for describing software modules of the image processing apparatus 101. These software modules are stored in the HDD 224 as programs, and the CPU 221 deploys these programs into the RAM 223 and executes the deployed programs.

The UI control module 311 controls content displayed on a non-illustrated display included in the image processing apparatus 101, and controls input from a non-illustrated input device. A print job management module 312 manages print job data received from a user. Specifically, the print job management module 312 executes processing for calling up a print job stored in the HDD 224, reflecting a change made by the user to print job settings, managing a history of printed jobs, and so forth. A print job processing module 313 executes processing that is necessary for executing print processing, such as analysis of a print job received from the user, deployment to create image data, and image compression/decompression. The print job processing module 313 also executes processing for generating later-described job attribute information of a print job, processing for applying a calibration table, and so forth. A data transmission and reception module 314 manages transmission and reception of various types of data to and from the image forming apparatus 100. The data transmission and reception module 314 transmits print job data generated by the print job processing module 313 to the image forming apparatus 100. The data transmission and reception module 314 also manages data transmission to and data reception from the client PC 102 that is connected via the network 106. A calibration execution module 315 controls a calibration function of the image processing apparatus 101. For example, the calibration execution module 315 instructs the print job processing module 313 to generate a measurement chart for calibration. The calibration execution module 315 also generates a calibration table using a patch measurement result that has been received from the image forming apparatus 100 via the data transmission and reception module 314. A calibration data management module 316 manages calibration setting information (FIG. 9) of the image processing apparatus 101, and the calibration table generated by the calibration execution module 315.

Figure 4A:
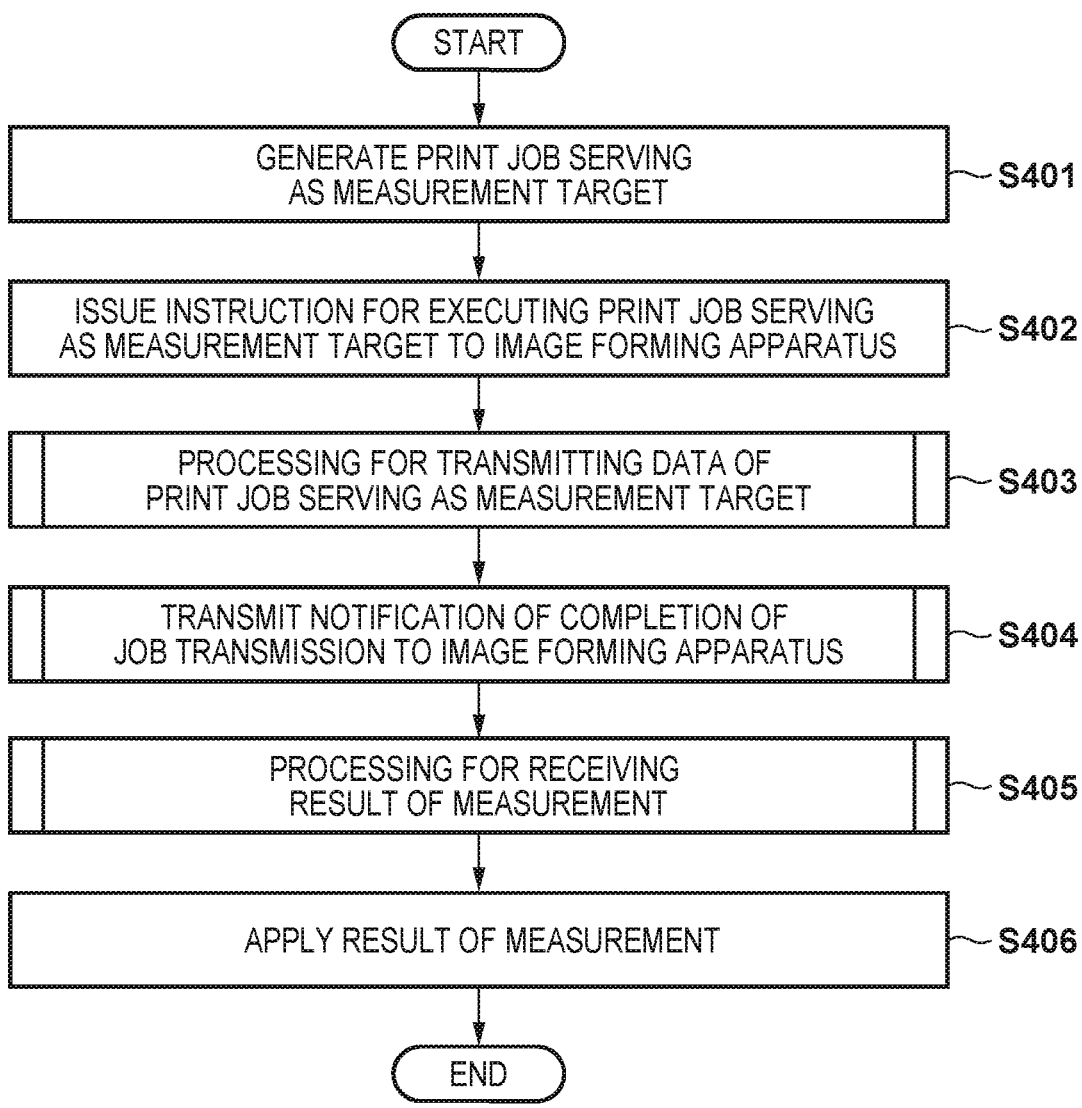
FIGS. 4A to 4C are flowcharts for describing processing executed by the image processing apparatus according to the first embodiment.
Figure 4B:
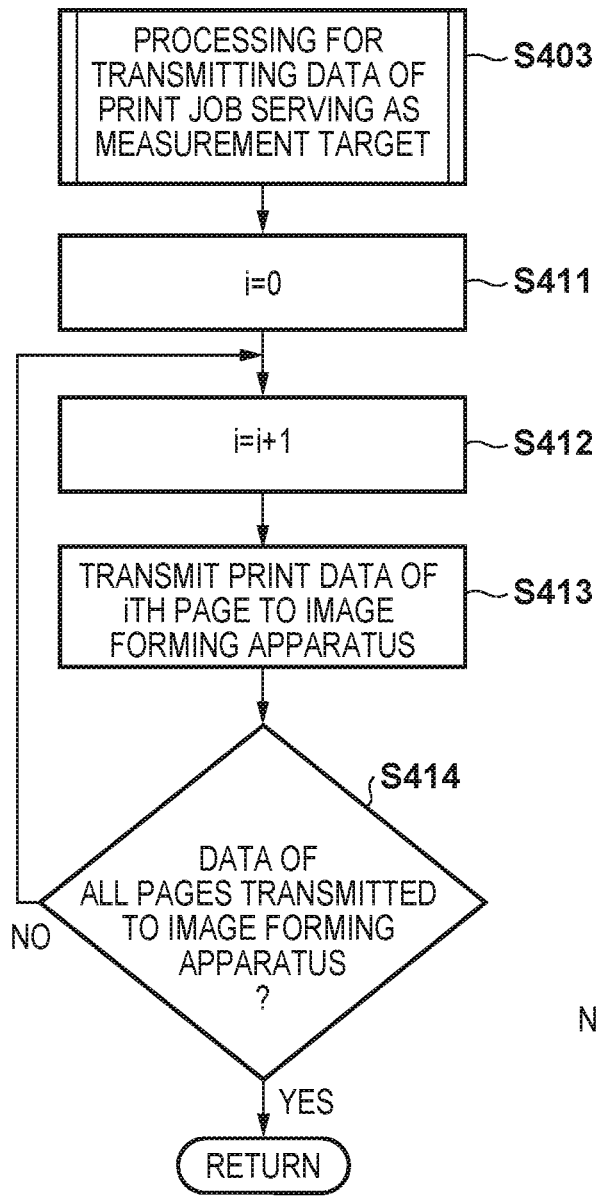

FIGS. 4A and 4B are flowcharts for describing processing executed by the image processing apparatus 101 according to the first embodiment. The processing of these flowcharts is implemented by the CPU 221 deploying programs stored in the HDD 224 of the image processing apparatus 101 into the RAM 223 and executing the deployed programs.

First, in step S401, the CPU 221 functions as the calibration execution module 315, and instructs the print job processing module 313 to generate a print job serving as a measurement target that is a print job for measuring chromaticity values of patches using the sensor 217. At this time, the calibration execution module 315 issues an instruction for generating the print job serving as the measurement target when, for example, a calibration execution instruction from the user is received via a non-illustrated console unit. Alternatively, the calibration execution module 315 may issue an instruction for automatically generating the print job serving as the measurement target when a predetermined condition is satisfied, for example, upon reaching the reserved time that has been set in advance. The print job processing module 313 appends job attribute information to the generated print job. This job attribute information is generated based on print settings received by the user, device setting information of the image processing apparatus 101, and the like. In the first embodiment, as this print job serves as the measurement target to be measured by the sensor 217, the job attribute information of the print job includes information for notifying the image forming apparatus 100 of the fact that this print job serves as the measurement target to be measured by the sensor 217.

FIGS. 6A to 6D depict views illustrating examples of job attribute information generated by the print job processing module 313 of the image processing apparatus 101 according to the embodiments.

Figure 6A:
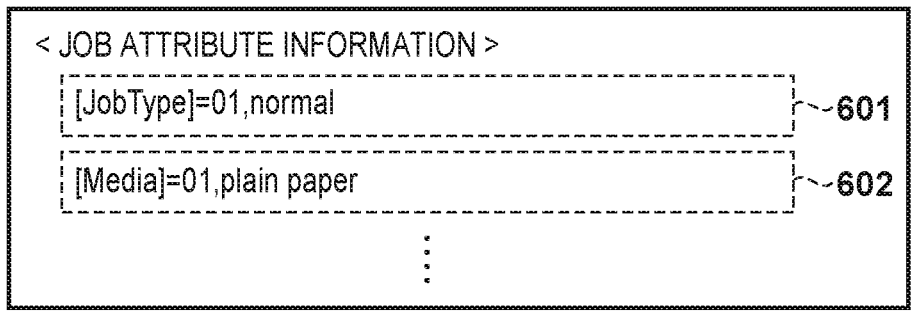
FIGS. 6A to 6D depict views illustrating examples of job attribute information generated by a print job processing module of the image processing apparatus according to the first to third embodiments.

FIG. 6A shows job attribute information of a normal print job that does not serve as the measurement target to be measured by the sensor 217. This job attribute information includes, as one type of job attribute, job type information 601 that is set to indicate "normal," which means the normal print job. Job attributes include not only job type information, but also various types of information to be referenced in print processing executed by the image forming apparatus 100, such as paper type 602 of a paper to be used in printing, non-illustrated information indicating the number of copies, and finishing setting information. In FIG. 6A, the paper type 602 indicates plain paper.

Figure 6B:
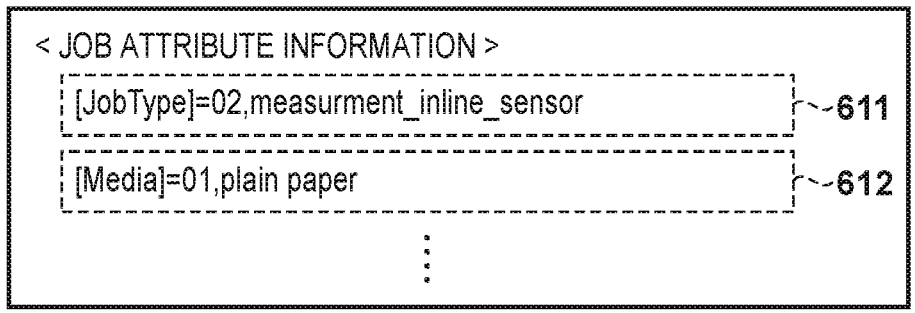

FIG. 6B shows job attribute information of the print job serving as the measurement target to be measured by the sensor 217. In the case of the print job serving as the measurement target, job type information 611 is set to indicate "measurement_inline_sensor" (measurement by an inline sensor). This job attribute information also includes paper type information 612 indicating paper used in printing (specifically, plain paper).

In the next step S402, the CPU 221 functions as the print job management module 312, and issues an instruction for executing the print job serving as the measurement target to the image forming apparatus 100 via the data transmission and reception module 314. This instruction for executing the print job serving as the measurement target includes the aforementioned job attribute information. In the next step S403, the CPU 221 functions as the print job processing module 313, and transmits print data of the print job serving as the measurement target (a print job for patches) to the image forming apparatus 100 via the data transmission and reception module 314. This print job serving as the measurement target is composed of one or more pages, and data of all pages that compose this print job serving as the measurement target is transmitted in order of pages. Note that the data transmission and reception module 314 obtains the number of pages that compose the print job serving as the measurement target from the print job processing module 313.

FIG. 4B is a flowchart for describing processing that is executed in step S403 to transmit data of the print job serving as the measurement target to the image forming apparatus 100.

In step S411, the CPU 221 functions as the data transmission and reception module 314, and sets a page counter i to "0." This page counter i is provided in the RAM 223. The data transmission and reception module 314 increments the page counter i by one in the next step S412, and then proceeds to step S413 to transmit print data (patch data) of the $i^{th}$ page indicated by the page counter i to the image forming apparatus 100. In the next step S414, the data transmission and reception module 314 determines whether or not print data of all pages that compose the print job serving as the measurement target has been transmitted. If print data of all pages has been transmitted, the processing for transmitting print data of the print job serving as the measurement target is ended, and step S404 follows. On the other hand, if the transmission of print data of all pages has not been completed, step S412 follows.

In the next step S404, the CPU 221 functions as the print job management module 312, and notifies the image forming apparatus 100 of the completion of transmission of print data of the print job serving as the measurement target via the data transmission and reception module 314.

In the next step S405, the CPU 221 functions as the data transmission and reception module 314, and receives, from the image forming apparatus 100, the result of measurement that was performed by the sensor 217 with respect to paper that was printed in accordance with the transmitted print job serving as the measurement target. Specifically, the CPU 221 receives the result of measurement of all pages that compose the print job serving as the measurement target in order of pages.

Figure 4C:
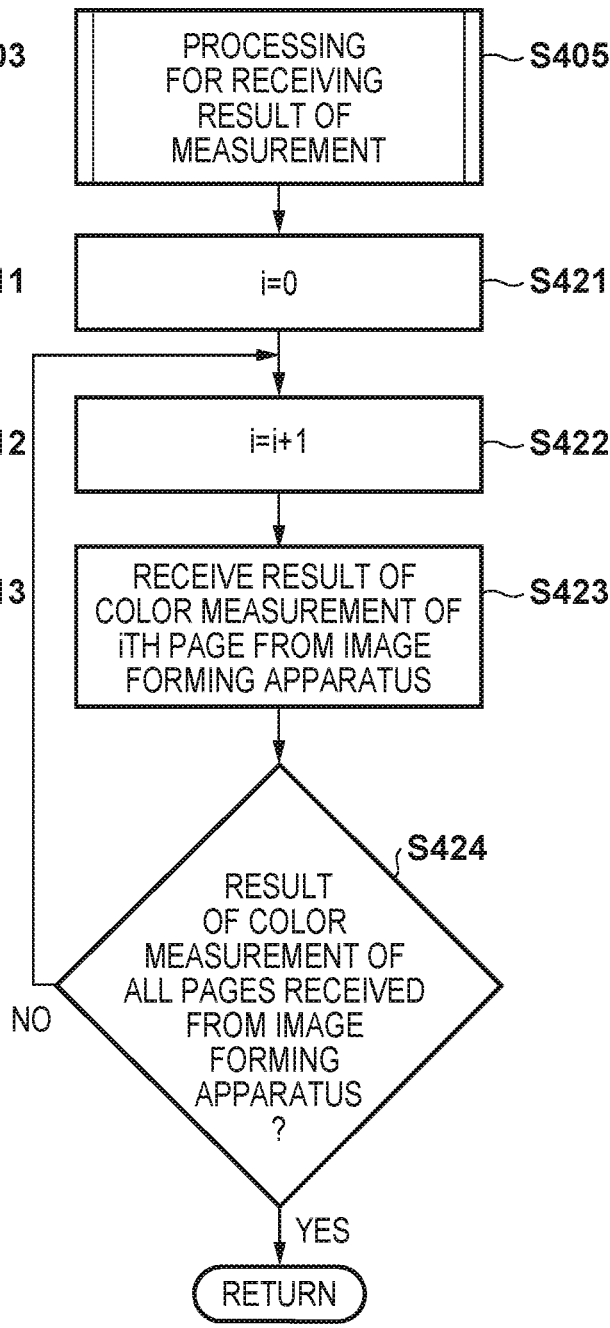

FIG. 4C is a flowchart for describing processing that is executed in step S405 to receive the result of measurement from the image forming apparatus 100.

In step S421, the CPU 221 functions as the data transmission and reception module 314, and sets a page counter i to "0." This page counter i is provided in the RAM 223. The data transmission and reception module 314 increments the page counter i by one in the next step S422, and then proceeds to step S423. In step S423, the CPU 221 functions as the data transmission and reception module 314, and receives the result of measurement of the $i^{th}$ page indicated by the page counter i from the image forming apparatus 100. In the next step S424, the data transmission and reception module 314 determines whether or not the result of measurement of all pages that compose the print job serving as the measurement target has been received. If it is determined that the result of measurement of all pages has been received, the processing for receiving the result of measurement of the print job serving as the measurement target is ended, and step S406 follows. On the other hand, if the reception of the result of measurement of all pages has not been completed, step S422 follows.

In step S406, the CPU 221 functions as the calibration execution module 315, and obtains the result of measurement of the print job serving as the measurement target via the data transmission and reception module 314. Then, the calibration execution module 315 generates a calibration table for image adjustment using the obtained result of measurement. The calibration data management module 316 stores this calibration table to the HDD 224. Finally, the CPU 221 functions as the data transmission and reception module 314, notifies the image forming apparatus 100 of the completion of calibration processing, and ends the present processing.

Thereafter, in processing for a normal print job, the print job processing module 313 obtains a desired calibration table from the calibration data management module 316, and applies the obtained calibration table to the print job.

Figure 5A:
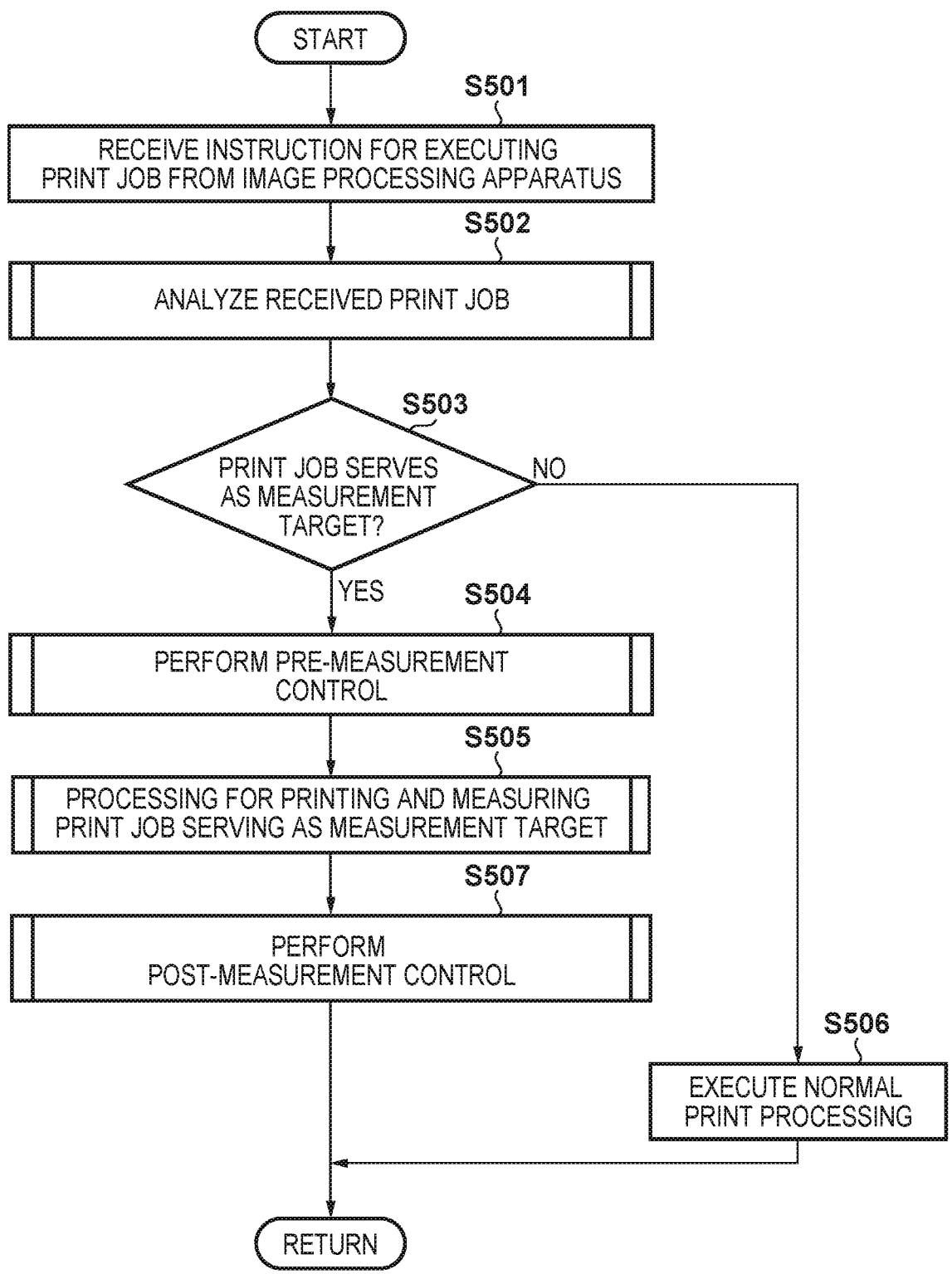
FIGS. 5A and 5B are flowcharts for describing processing executed by the image forming apparatus according to the first and second embodiments.
Figure 5B:
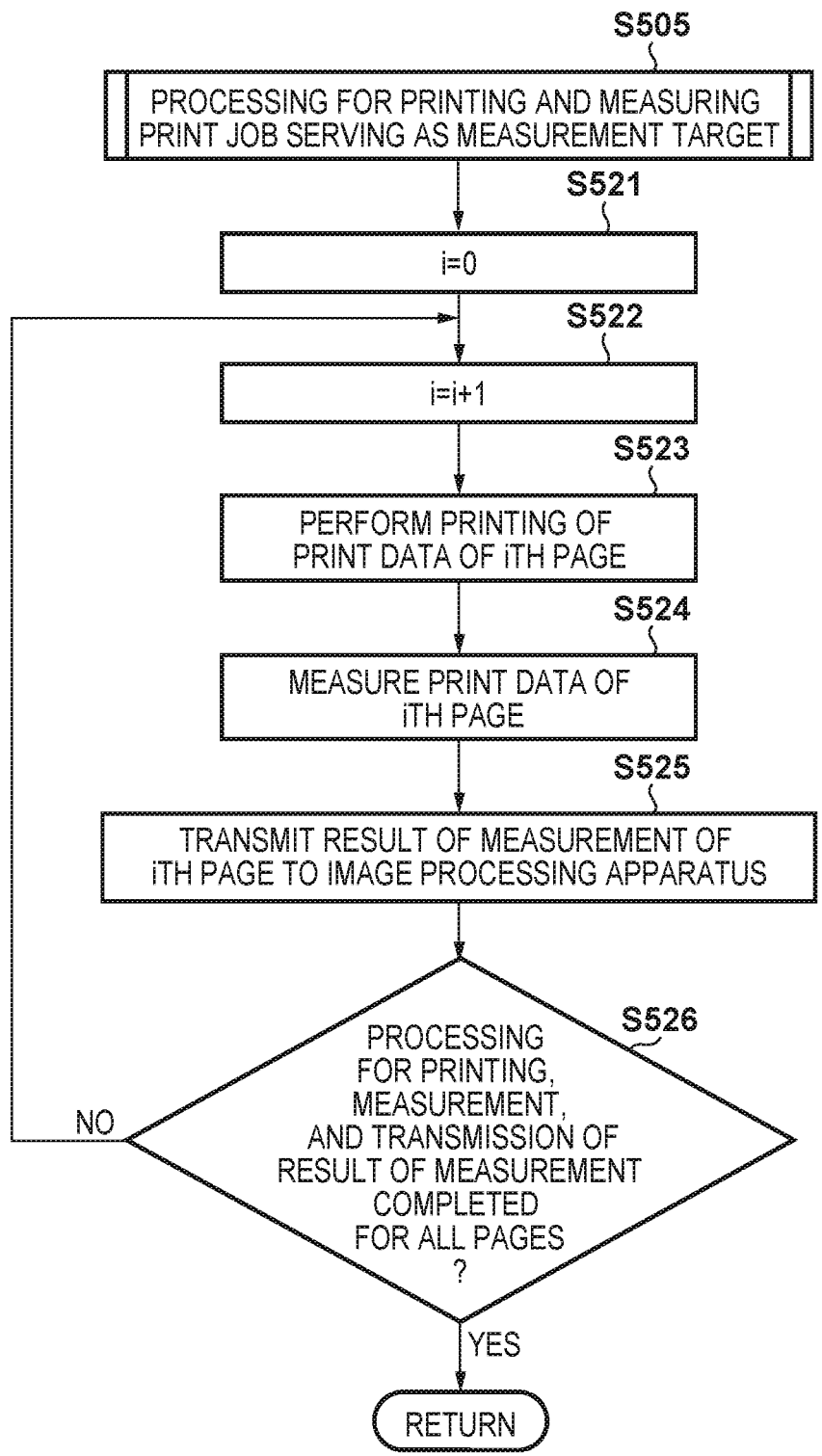

FIGS. 5A and 5B are flowcharts for describing processing executed by the image forming apparatus 100 according to the first embodiment. The processing of these flowcharts is implemented by the CPU 201 deploying programs stored in the HDD 204 of the image forming apparatus 100 into the RAM 203 and executing the deployed programs.

Referring to FIG. 5A, in step S501, the CPU 201 receives an instruction for executing a print job from the image processing apparatus 101. In the next step S502, the CPU 201 functions as the print job analysis module 302, and analyzes the aforementioned job attribute information included in the instruction received in step S501, that is, the instruction for executing the print job. In the next step S503, the print job analysis module 302 determines whether or not the print job serves as a measurement target to be measured by the sensor 217 with reference to the job type information 601 (611) shown in FIG. 6A (6B). The processing proceeds to step S504 if it is determined that the print job serves as the measurement target to be measured by the sensor 217, and the processing proceeds to step S506 if it is determined that the print job does not serve as the measurement target. In step S506, the CPU 201 executes normal print processing, and ends the present processing.

On the other hand, in step S504, the CPU 201 functions as the sensor control module 305, and performs the aforementioned pre-measurement sensor preparation operations. In the next step S505, the CPU 201 executes processing for printing and measuring the print job serving as the measurement target and transmitting the result of the measurement, and ends the present processing.

FIG. 5B is a flowchart for describing the processing that is executed in step S505 to print and measure the print job serving as the measurement target and transmit the result of the measurement.

In step S521, the CPU 201 functions as the print execution module 303, and sets a page counter i to "0." This page counter i is provided in the RAM 203. The print execution module 303 increments the page counter i by one in the next step S522, and then the processing proceeds to step S523 to print the print data of the $i^{th}$ page indicated by the page counter i. In the next step S524, the CPU 201 functions as the sensor control module 305, and controls the sensor 217 to measure the patch images 251 that were printed in accordance with the print data of the $i^{th}$ page and that are passing the sensor 217 on the paper conveyance path. In the next step S525, the sensor control module 305 transmits the result of measurement of the print data of the $i^{th}$ page to the image processing apparatus 101 via the data transmission and reception module 304. In the next step S526, the CPU 201 functions as the data transmission and reception module 304, and determines whether or not the processing for printing, measurement, and transmission of the result of measurement has been completed for all pages that compose the print job serving as the measurement target. If it is determined that the processing has been completed for all pages, the CPU 201 ends the processing for printing, measurement, and transmission of the result of measurement of the print job serving as the measurement target, and the processing proceeds to step S507. On the other hand, if it is determined that the processing has not been completed for all pages, step S522 follows.

In step S507, the CPU 201 performs post-printing control of the print job serving as the measurement target. Specifically, the CPU 201 functions as the data transmission and reception module 304, and notifies the image processing apparatus 101 of the completion of outputting of the print job serving as the measurement target. Furthermore, the sensor control module 305 stops power supply to the sensor 217.

In the first embodiment, the image forming apparatus 100 transmits the result of measurement performed by the sensor 217 to the image processing apparatus 101, and the calibration execution module 315 of the image processing apparatus 101 generates a calibration table using the received result of measurement. No limitation is intended, however, in this regard. For example, a non-illustrated calibration execution module of the image forming apparatus 100 may generate a calibration table of the image processing apparatus 101 using the result of measurement performed by the sensor 217, and transmit the generated calibration table to the image processing apparatus 101. In this case, the image forming apparatus 100 does not transmit the result of measurement to the image processing apparatus 101 in step S525, and stores the result of measurement to the HDD 204. Then, in step S507, the non-illustrated calibration execution module of the image forming apparatus 100 generates a calibration table by reading out the result of measurement from the HDD 204, and transmits the generated calibration table to the image processing apparatus 101 via the data transmission and reception module 304.

On the other hand, the image processing apparatus 101 receives the calibration table, instead of the result of measurement performed by the sensor 217, from the image forming apparatus 100 in step S405. Then, in step S406, the calibration data management module 316 stores the calibration table received from the image forming apparatus 100 in the HDD 224.

As described above, in the print system according to the first embodiment, the adjustment function of the image processing apparatus 101 can use the result of measurement performed by the sensor of the image forming apparatus 100. Accordingly, the adjustment function of the image processing apparatus 101 can be automated, thereby reducing a work load on an operator.

Furthermore, the image processing apparatus 101 appends a unique job attribute to a print job serving as a measurement target, and inputs the resultant print job to the image forming apparatus 100. Thus, the image forming apparatus 100 applies specific print processing only when it executes the print job serving as the measurement target. The execution of the specific print processing requires advance processing, such as the preparation operations and connection confirmation. On the other hand, as the image forming apparatus 100 does not apply such specific print processing to a normal print job, a reduction in the productivity of the print system can be prevented.

Second Embodiment

In the above-described first embodiment, processing that is executed by the image forming apparatus 100 to print and to measure a chart based on a print job serving as a measurement target is uniquely determined. In practice, however, processing for a print job serving as a measurement target is executed using different methods depending on the types and the functions of the image processing apparatus 101. Therefore, the image forming apparatus 100 needs to switch among methods of controlling a print job serving as a measurement target depending on the conditions. For example, the image processing apparatus 101 that generates a print job serving as a measurement target is not limited to having a calibration function, and may also have a color profile generation function and a verification function. The color profile generation function is a known function that generates a file called an International Color Consortium (ICC) profile that defines colors of digital data handled in the present print system and is described using color information conforming to a standardized color management system. This ICC profile is generated by printing predetermined color patches on an arbitrary sheet and obtaining chromaticity values by measuring the color patches.

The verification function is a known function intended to confirm an output state of the print system. Patches that are intended to confirm the output state are printed on an arbitrary sheet, and whether the output of the print system satisfies certain standards is determined based on the result of measurement of the patches. As the number of patches required to obtain measurement values differs among the functions, there is a case in which different numbers of patches are printed per sheet. For this reason, the sensor control module 305 of the image forming apparatus 100 needs to control a measurement operation of the sensor 217 so as to measure the requested number of patches on a case-by-case basis.

There is also a case in which the types of data used in calibration differ depending on the types of the image processing apparatus 101. Some image processing apparatuses may require chromaticity values (L*, a*, and b*), while other image processing apparatuses may require density values. Therefore, the sensor control module 305 needs to control, for example, measurement processing executed by the sensor 217 to obtain measurement values of a required type, or processing for converting measurement values. Although a second embodiment introduces a mode in which multiple types of measurement values can be obtained by switching among ways of controlling sensors of a certain type, the present invention is not limited in this way. For example, the image forming apparatus 100 may include multiple types of sensors to obtain multiple types of measurement values, and the sensor control module 305 may control and use different sensors depending on the conditions.

The following description of the second embodiment of the present invention introduces an example in which the image forming apparatus 100 switches among control methods related to a print job serving as a measurement target based on attribute information that has been appended to the print job by the image processing apparatus 101. Hereafter, differences from the first embodiment will be described, and a description of portions that are similar to the first embodiment will be omitted.

First, the definitions and the conditions of chart type attributes 701 (FIGS. 6C and 7) according to the second embodiment of the present invention will be described with reference to FIG. 7.

FIG. 7 depicts a view illustrating an example of a chart type information table according to the second embodiment, and presents various types of information associated with chart type attributes.

This chart type information table includes a chart type attribute 701, an image processing apparatus type 702, an image processing apparatus function type 703, a request data type 704, and the number of measurement patches 705. The image processing apparatus type 702 indicates the type of the image processing apparatus 101 connected to the image forming apparatus 100. The image processing apparatus function type 703 indicates a function type of the image processing apparatus 101 that requires measurement using a chart. The function type includes the aforementioned calibration, color profile generation function, and verification function. The request data type 704 indicates a data type requested by the functions that require measurement using a chart, and includes density values and chromaticity values. The number of measurement patches 705 indicates the number of patches to be printed on one sheet.

Both the image forming apparatus 100 and the image processing apparatus 101 store a part or all of the information indicated by this chart type information table in their respective HDDs, and their respective CPUs read out the part or all of the information for reference, as needed.

Figure 6C:
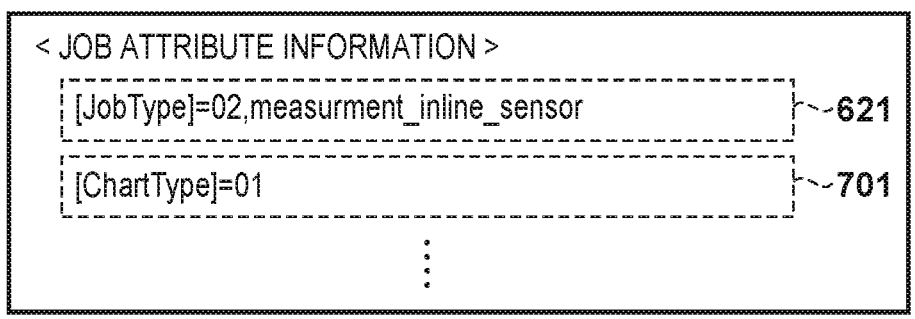

The following description relates to a method of controlling the image processing apparatus 101 according to the second embodiment with reference to the above-described flowcharts of FIGS. 4A to 4C and an example of job attribute information shown in FIG. 6C.

When generating a print job serving as a measurement target in step S401 of FIG. 4A, the print job processing module 313 of the image processing apparatus 101 generates job attribute information shown in FIG. 6C with a chart type attribute 701 included therein. This chart type attribute 701 is determined based on the image processing apparatus type 702 and the image processing apparatus function type 703 in the aforementioned chart type information table. For example, when the type of the image processing apparatus 101 is "B" and the function type that requires chart measurement is "calibration," the print job processing module 313 determines "03" as the chart type attribute 701.

The following description relates to a method of controlling the image forming apparatus 100 according to the second embodiment with reference to the above-described flowcharts of FIGS. 5A and 5B.

In step S502, the print job analysis module 302 identifies both job type information 621 and the chart type attribute 701 by analyzing the job attribute information received in step S501. In the next step S503, if it is determined that the received print job serves as a measurement target, the print job analysis module 302 transmits the chart type attribute 701 to the sensor control module 305.

At the beginning of the processing of step S505, the sensor control module 305 obtains the request data type 704 and the number of measurement patches 705 associated with the chart type attribute 701 with reference to the chart type information table shown in FIG. 7. Then, based on the obtained information, the sensor control module 305 measures patches in step S524, and transmits the result of measurement in step S525. For example, when the chart type attribute 701 indicates "03", the request data type 704 indicates "chromaticity values," and the number of measurement patches 705 indicates "19*N" (* denotes multiplication, and N denotes the number of sensors). In this case, in step S524, the sensor control module 305 controls the measurement operation of the sensor 217 so that one sensor measures "19" patches on the first sheet. Then, in step S525, the sensor control module 305 transmits chromaticity values that comply with the data type requested by the image processing apparatus 101, to the image processing apparatus 101 via the data transmission and reception module 304.

When the sensors are spectral sensors and the request data type indicates "density values" as in the case of the chart type attribute 701 indicating "01," the sensor control module 305 converts spectral values obtained as a result of measurement into density values using a known conversion method, and transmits the density values to the image processing apparatus 101.

As described above, in the second embodiment, the image forming apparatus can appropriately switch among ways of controlling a print job serving as a measurement target depending on the types and functions of the connected image processing apparatus. Thus, the image forming apparatus 100 can implement functions corresponding to a variety of requests from the commercial printing market in coordination with a plurality of image processing apparatuses.

Third Embodiment

In general, the calibration function of the image forming apparatus 100 is implemented in a mode that enables execution of adjustment and management of the result of adjustment by paper type or by group. In this mode, while the image forming apparatus 100 is processing a print job serving as a measurement target, the image processing apparatus 101 may transmit, to the image forming apparatus 100, a normal print job that uses paper to be adjusted by the print job serving as the measurement target. In this case, the adjustment by the print job serving as the measurement target, which is currently executed by the image forming apparatus 100, is not applied to the normal print job for the following reason. The image processing apparatus 101 usually applies calibration-based adjustment to a print job before transmitting the print job to the image forming apparatus 100. Therefore, once the print job has been transmitted to the image forming apparatus 100, it is not possible to subsequently apply the result of adjustment updated by the image forming apparatus 100 to the transmitted print job.

To address this issue, a third embodiment of the present invention introduces an example in which the image forming apparatus 100 uses information of a type of paper to be adjusted by the print job serving as the measurement target, which is currently in execution, and the type of paper used in the subsequent normal print job to determine whether or not to proceed with processing for the subsequent normal print job. Hereafter, differences from the above-described first embodiment will be described, and a description of portions that are similar to the above-described first embodiment will be omitted.

First, with reference to FIG. 9, a description will be given of a calibration setting table showing a correspondence between calibration settings in the image processing apparatus 101 according to the third embodiment and the types of paper to be adjusted.

FIG. 9 depicts a view illustrating an example of the calibration setting table according to an embodiment.

This calibration setting table includes calibration setting numbers 901, calibration setting names 902, and types of paper to be adjusted 903. The calibration setting numbers 901 are index values allocated to the calibration settings. The calibration setting names 902 are the names of the calibration settings. The types of paper to be adjusted 903 indicate the types of paper to which the results of adjustment according to the calibration settings are to be applied. For example, the result of adjustment according to a calibration setting "00" is applied to a print job that uses one of "plain" paper and "thin" paper that are defined in the present print system.

Note that the paper types indicated by the types of paper to be adjusted 903 in FIG. 9 represent some examples, and other paper types exist. Every one of paper types handled in the print system is associated with one of the calibration settings. The image processing apparatus 101 can add a customized calibration setting in association with a paper type registered by the user under an instruction from the user.

The calibration data management module 316 of the image processing apparatus 101 manages the calibration setting table. The calibration data management module 316 performs control to always keep an up-to-date status of the calibration setting table in response to user-initiated processing for, for example, changing and adding a calibration setting.

Furthermore, the calibration data management module 316 shares the up-to-date status of the calibration setting table by transmitting the calibration setting table to the image forming apparatus 100 at predetermined timings. Examples of the predetermined timings include the time of establishment of connection between the image processing apparatus 101 and image forming apparatus 100, and a timing at which the image processing apparatus 101 updates the calibration setting information. The image forming apparatus 100 stores the calibration setting table received from the image processing apparatus 101 in the HDD 204. The calibration data management module 306 reads out the calibration setting table from the HDD 204 for reference during execution of processing, as will be described later.

The following describes processing that is executed by the image forming apparatus 100 according to the third embodiment with reference to a flowchart of FIG. 8.

FIG. 8 is a flowchart for describing processing that is executed by the image forming apparatus 100 according to the third embodiment. The processing of this flowchart is implemented by the CPU 201 deploying programs stored in the HDD 204 of the image forming apparatus 100 into the RAM 203 and executing the deployed programs.

First, in step S801, the CPU 201 receives an instruction for executing a normal print job B from the image processing apparatus 101. In the next step S802, the CPU 201 determines whether a print job A serving as a measurement target is in a standby state or in execution before the normal print job B received in step S801. If it is determined that the print job A serving as the measurement target is neither in a standby state nor in execution before the normal print job B, the processing proceeds to step S809, and the CPU 201 executes the normal print job B, and ends the present processing.

On the other hand, if it is determined that the print job A serving as the measurement target is in a standby state or in execution before the normal print job B in step S802, the processing proceeds to step S803. In step S803, the CPU 201 functions as the print job analysis module 302, and obtains information for determining whether the normal print job B will be affected by the print job A serving as the measurement target by analyzing both job information of the print job A serving as the measurement target and job information of the normal print job B.

Figure 6D:
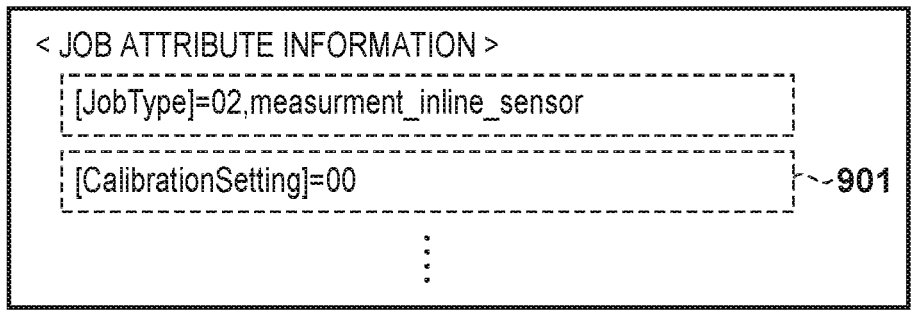

FIG. 6D depicts a view illustrating an example of a job attribute of the print job A serving as the measurement target according to the third embodiment. The print job analysis module 302 obtains the calibration setting number 901 by analyzing the job information of the print job A serving as the measurement target. The print job analysis module 302 also obtains the print paper type 602 by analyzing the job attribute information of the normal print job B (FIG. 6A). In the next step S804, the print job analysis module 302 determines whether or not the normal print job B will be affected by the print job A serving as the measurement target with reference to the information obtained in step S803 and the calibration setting table (FIG. 9) managed by the calibration data management module 306.

For example, assume a case in which the calibration setting number 901 of the print job A serving as the measurement target indicates "00" as shown in FIG. 6D. In this case, based on the types of paper to be adjusted 903 in the calibration setting table, it can be determined that "plain" paper and "thin" paper are to be adjusted by the print job serving as the measurement target. Provided that the paper type 602 of the normal print job B indicates "plain paper" as shown in FIG. 6A, it matches the types of paper to be adjusted by the print job A serving as the measurement target. Thus, it is determined that the normal print job B will be affected by the print job A serving as the measurement target.

As in the foregoing case, if the CPU 201 determines that the normal print job B will not be affected by the print job A serving as the measurement target in step S804, the processing proceeds to step S809. Then, after processing for the print job A serving as the measurement target has been completed, the print execution module 303 executes print processing for the normal print job B, and ends the present processing.

On the other hand, if the CPU 201 determines that the normal print job B will be affected by the print job A serving as the measurement target in step S804, the processing proceeds to step S805. In step S805, the CPU 201 cancels the normal print job B, and transmits a job cancellation notification indicating the cancellation of the normal print job B to the image processing apparatus 101. This job cancellation notification includes information indicating the cause of the cancellation. In the third embodiment, an attribute value indicating the cause being the effect of the preceding print job A serving as the measurement target is defined between the image forming apparatus 100 and the image processing apparatus 101 via I/Fs. Therefore, the CPU 201 of the image processing apparatus 101 controls the data transmission and reception module 304 to transmit this attributed value indicating the cause of the job cancellation, as well as job identification information of the print job A serving as the measurement target, to the image processing apparatus 101.

In the next step S806, if the CPU 201 confirms the completion of processing for the print job A serving as the measurement target based on information from the print execution module 303, the processing proceeds to step S807. In step S807, the CPU 201 receives, from the image processing apparatus 101, a notification of completion of calibration processing based on the result of measurement of the print job A serving as the measurement target. In the next step S808, the CPU 201 receives the normal print job B to which the latest calibration has been applied based on the result of measurement of the print job A serving as the measurement target from the image processing apparatus 101 via the data transmission and reception module 304. In the next step S809, the CPU 201 functions as the print execution module 303, executes print processing for the normal print job B, and ends the present processing.

A description is now given of control that is performed by the image processing apparatus 101 in relation to re-print processing for the normal print job B in step S808.

In step S805, the image processing apparatus 101 receives the job cancellation notification indicating the cancellation of the normal print job B, the cause of the cancellation, and a job ID attribute of the print job A serving as the measurement target from the image forming apparatus 100. Upon receiving the job cancellation notification, the print job management module 312 of the image processing apparatus 101 analyzes the cause of the cancellation, and determines that the cause of the cancellation is the print job A serving as the measurement target. Then, it references a job ID of the print job A serving as the measurement target, and executes the processing for receiving the result of measurement of the print job A serving as the measurement target (step S405) as well as the processing of applying the result of measurement to calibration (step S406). Upon completion of this set of processing, the print job management module 312 generates the normal print job B in accordance with the new calibration, and transmits the generated normal print job B to the image forming apparatus 100.

As described above, in the third embodiment, the image forming apparatus 100 determines whether or not to proceed with processing for a normal print job B with reference to a paper to be adjusted by a currently executed print job A serving as a measurement target and the type of paper used in the subsequent normal print job B. If it is determined that processing for a print job B should not be advanced, the print job B is cancelled, an issuer of the print job re-generates the print job B by applying the optimum adjustment result, and then, print processing is executed.

As a result, a normal print job B that uses a type of paper used by a currently executed adjustment function can be prevented from being executed before application of the latest adjustment. Furthermore, in this case, the image processing apparatus 101 automatically applies the latest adjustment when re-generating a print job B that was previously transmitted but cancelled, and causes the re-generated print job B to be printed. Therefore, print processing can be reliably executed in an optimum state without troubling the user.

Fourth Embodiment

A fourth embodiment of the present invention will now be described. The sensor 217 of the image forming apparatus 100 usually requires predetermined preparation operations before performing the measurement. Examples of the predetermined preparation operations include the connection confirmation, that is, confirmation of whether the sensor 217 is normally connected at a predetermined position in the image forming apparatus 100, a warming up operation to emit light mandatorily until the self temperature rise of an illumination light source stabilizes, and a light amount adjustment operation to bring an adjusted light amount of the illumination light source close to a target value. Furthermore, in order to detect an abnormality in a reading operation of the sensor 217, the white reference plate that is located near the sensor 217 is measured, and whether the measured value falls within the certain reference range is confirmed. As the preparation operations may take several tens of seconds, the preparation operations affect a total amount of time required for an adjustment function (calibration function) and reduce the productivity. As excessive sensor preparation operations will shorten the machine lives of operating components, preparation operations should be kept at the minimum required level. There is a conventionally known technique to skip overlapping processing that is shared by two different adjustment functions executed by the image forming apparatus 100. There is no known technique, however, to skip overlapping processing when executing the same adjustment function multiple times. In view of this, the fourth embodiment introduces a technique to skip overlapping processing when executing the same adjustment function multiple times in the image forming apparatus 100. The hardware configurations of the image forming apparatus 100 and the image processing apparatus 101, the system configuration, and the like, according to the fourth embodiment are similar to those according to the above-described embodiments, and thus, a description thereof will be omitted.

The printer controller 200 of the image forming apparatus 100 according to the fourth embodiment performs predetermined preparation operations before the sensor 217 performs measurement. Examples of the predetermined preparation operations include the connection confirmation, that is, confirmation of whether normal connection is established between the sensor 217 and the sensor I/F 208, the warming up operation to emit light mandatorily until the self temperature rise of the illumination light source stabilizes, and the light amount adjustment operation to bring an adjusted light amount of the illumination light source close to a target value.

The image processing apparatus 101 according to the fourth embodiment transmits a print job serving as a measurement target to the image forming apparatus 100 in line with the above-described flowchart of FIG. 4A.

In step S404 of FIG. 4A, the CPU 221 functions as the print job management module 312, and notifies the image forming apparatus 100 of the completion of transmission of print data of the print job serving as the measurement target via the data transmission and reception module 314. At this time, information transmitted by the print job management module 312 has job completion information shown in FIGS. 10A to 10C appended thereto.

Figure 10A:
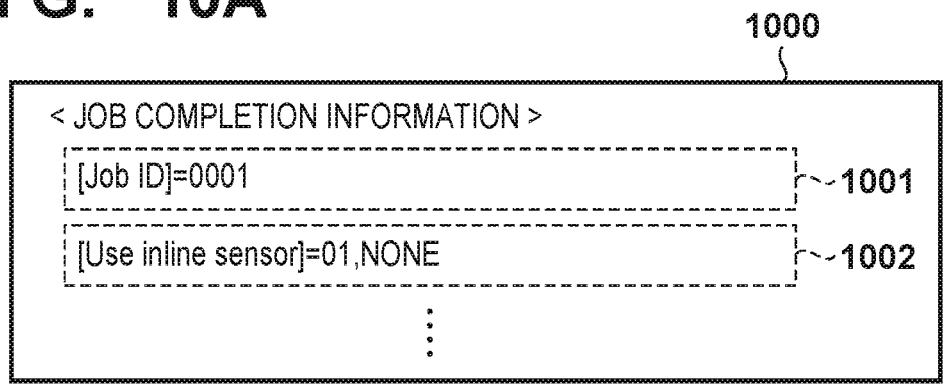
FIGS. 10A to 10C depict views illustrating examples of job completion information generated by a print job management module of the image processing apparatus according to a fourth embodiment.
Figure 10B:
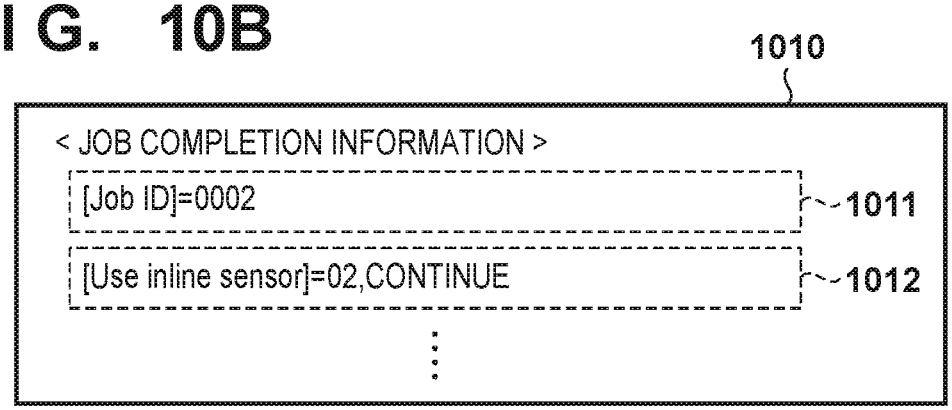
Figure 10C:
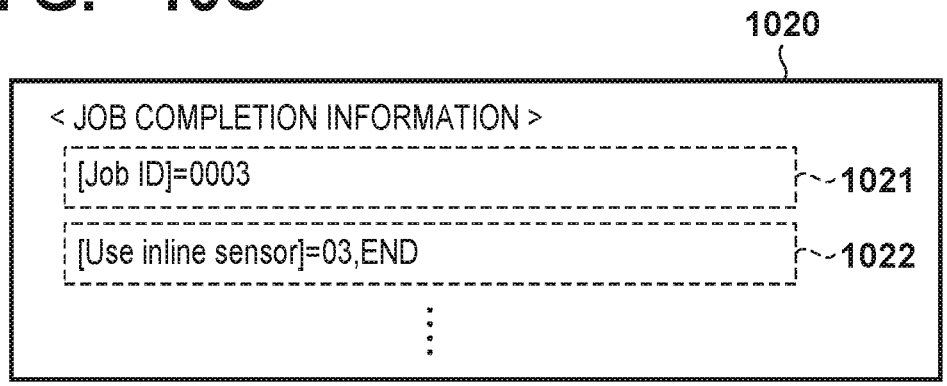

FIGS. 10A to 10C depict views illustrating examples of job completion information generated by the print job management module 312 of the image processing apparatus 101 according to the fourth embodiment.

FIG. 10A shows job completion information 1000 for a case in which a currently printed job is a normal print job that does not serve as the measurement target. This job completion information 1000 includes a job ID 1001 representing an ID unique to a print job as job completion information, and serves as a notification of completion of a print job with a job ID "0001." Information 1002 indicates whether a subsequent print job serves as the measurement target. When a currently printed job is a normal print job that does not serve as the measurement target, "use inline sensor" is set to indicate "none."

FIG. 10B shows job completion information 1010 for the case of a print job serving as a measurement target that will be followed by another print job serving as a measurement target. A job ID 1011 represents an ID unique to a print job, and as the subsequent print job also serves as the measurement target, "use inline sensor" is set to indicate "continue" as indicated by 1012.

FIG. 10C shows job completion information 1020 for the case of a print job serving as a measurement target that will be followed by a normal print job that does not serve as the measurement target. A job ID 1021 represents an ID unique to a print job, and as the subsequent job is a normal print job, "use inline sensor" is set to indicate "end," as indicated by 1022.

Note that the job completion information is not limited to being structured as described above. For example, information representing an instruction for cancellation of a print job may be appended to the job completion information.

Using a flowchart, the following description relates to a method used by the image processing apparatus 101 according to the fourth embodiment to set the job completion information that has been described using FIGS. 10A to 10C.

Figure 11:
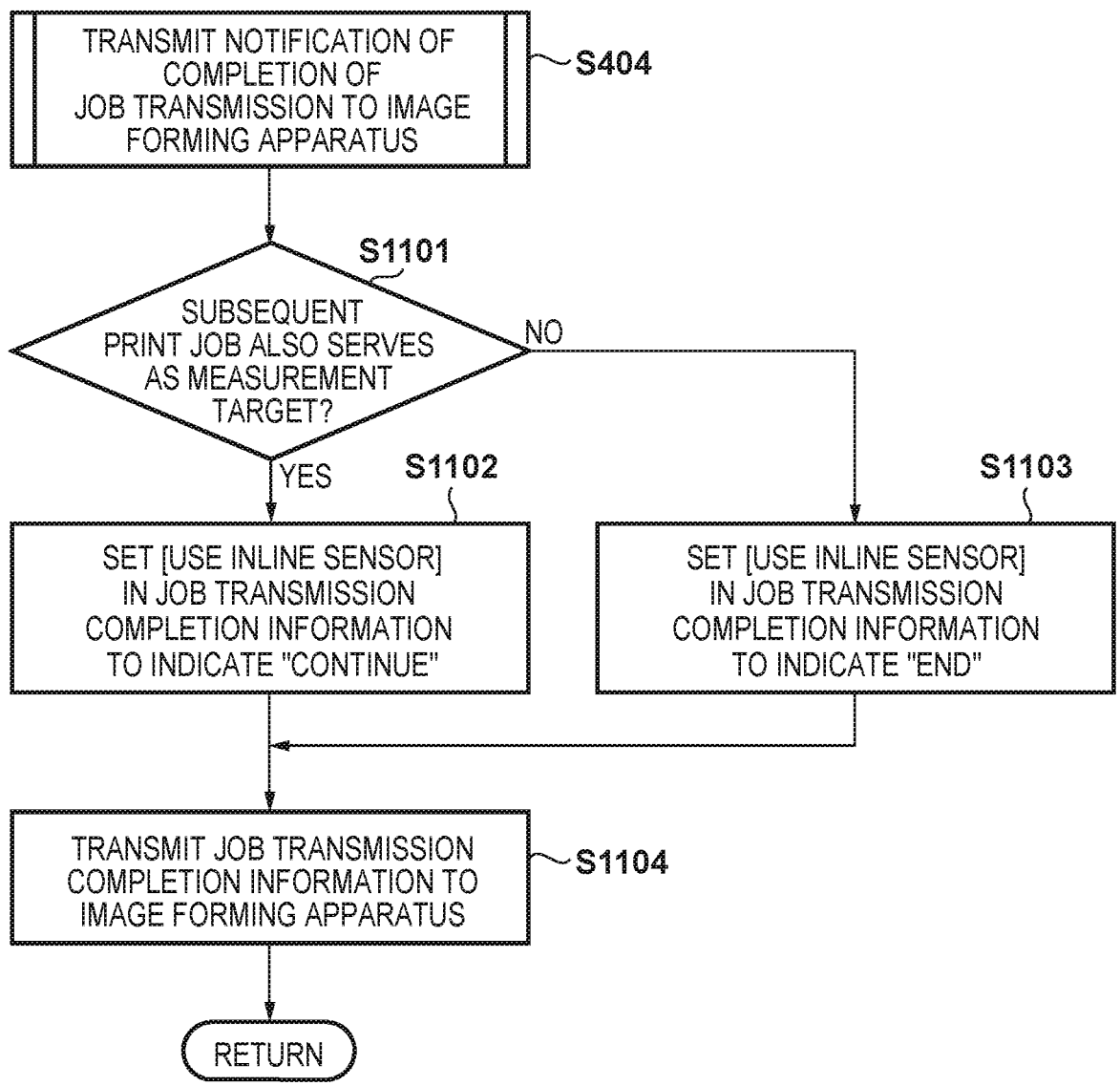
FIG. 11 is a flowchart for describing processing that is executed by the image processing apparatus 101 according to the fourth embodiment to transmit a notification of completion of data transmission for a print job serving as a measurement target to the image forming apparatus.

FIG. 11 is a flowchart for describing processing that is executed by the image processing apparatus 101 according to the fourth embodiment to transmit a notification of completion of data transmission for a print job serving as a measurement target to the image forming apparatus 100 (step S404 of FIG. 4A). The processing of this flowchart is implemented by the CPU 221 deploying programs stored in the HDD 224 of the image processing apparatus 101 into the RAM 223 and executing the deployed programs.

First, in step S1101, the CPU 221 functions as the print job management module 312, and determines whether or not a subsequent print job also serves as the measurement target. If the CPU 221 determines that the subsequent print job also serves as the measurement target, the processing proceeds to step S1102, and the CPU 221 sets "use inline sensor" to indicate "continue," and then the processing proceeds to step S1104. On the other hand, if the CPU 221 determines that the subsequent print job is a normal print job that does not serve as the measurement target, the processing proceeds to step S1103, and the CPU 221 sets "use inline sensor" to indicate "end," and then the processing proceeds to step S1104. In step S1104, the CPU 221 functions as the print job management module 312, notifies the image forming apparatus 100 of the completion of transmission of print data of the print job serving as the measurement target, together with the job completion information, via the data transmission and reception module 314, and ends the present processing.

There is a case in which, after the image forming apparatus 100 is notified of job completion information in which "use inline sensor" is set to indicate "continue," the client PC 102, and the like, input a normal print job before the issuance of an instruction for starting printing of a subsequent print job serving as a measurement target. In this case, it is preferable that the print job management module 312 of the image processing apparatus 101 places the normal print job in a standby state by leaving the normal print job unexecuted until the subsequent print job serving as the measurement target is completed.

Then, in step S405, the CPU 221 functions as the data transmission and reception module 314, and receives the result of measurement of the transmitted print job serving as the measurement target from the image forming apparatus 100. Specifically, the CPU 221 receives the result of measurement of all pages that compose the print job serving as the measurement target in order of pages. In the next step S406, the CPU 221 functions as the calibration execution module 315, and obtains the result of measurement received via the data transmission and reception module 314. Then, a calibration table for image adjustment is generated using the obtained result of measurement, and is stored in the HDD 224. Thereafter, the image forming apparatus 100 is notified of the completion of calibration processing via the data transmission and reception module 314, and the present processing is ended.

FIG. 12A is a flowchart for describing the pre-measurement sensor preparation operations that are performed by the image forming apparatus 100 according to the fourth embodiment in step S504 of FIG. 5A. The processing of this flowchart is implemented by the CPU 201 deploying programs stored in the HDD 204 of the image forming apparatus 100 into the RAM 203 and executing the deployed programs.

First, in step S1201, the CPU 201 functions as the sensor control module 305, and determines whether the sensor 217 is in operation. The sensor 217 being in operation means that the pre-measurement preparation operations therefor have been completed and the sensor 217 can measure colors any time. Examples of the sensor preparation operations include the connection confirmation, that is, confirmation of whether normal connection is established between the sensor 217 and the sensor I/F 208, the warming up operation to emit light mandatorily until the self temperature rise of the illumination light source stabilizes, and the light amount adjustment operation to bring an adjusted light amount of the illumination light source close to a target value. Another example of the sensor preparation operations include processing for detecting an abnormality in a reading operation of the sensor by measuring the white reference plate that is located near the sensor, and confirming whether the measured value falls within the certain reference range. If it is determined that the sensor 217 is in operation, the present processing is ended. In other words, the preparation operations for the sensor 217 are skipped. On the other hand, if it is determined that the sensor 217 is not in operation, the processing proceeds to step S1202 and the CPU 201 performs the predetermined preparation operations. After the preparation operations for the sensor 217 have been completed, the sensor 217 is placed in operation in the next step S1203.

FIG. 12B is a flowchart for describing control that is performed by the image forming apparatus 100 according to the fourth embodiment in step S507 of FIG. 5A after performing printing for a print job serving as a measurement target.

First, in step S1211, the CPU 201 functions as the print job analysis module 302, and determines whether or not "use inline sensor" is set to indicate "continue" by analyzing the job completion information 1012 (1022) set in a job completion notification. If it is determined that "use inline sensor" is set to indicate "continue" as shown in FIG. 10B for example, the processing is ended. In other words, the sensor 217 is kept in operation for a subsequent print job serving as a measurement target without stopping power supply thereto.

On the other hand, if "use inline sensor" in the job completion information of the print job is not set to indicate "continue," but is set to indicate "end," as shown in FIG. 10C, for example, step S1212 follows. In step S1212, the CPU 201 functions as the sensor control module 305, ends the operations of the sensor 217 by cutting off power supply to the sensor 217, and ends the present processing.

In the above-described example, if "use inline sensor" in the job completion information of the print job serving as the measurement target is set to indicate "continue," the sensor 217 is kept in operation for the subsequent print job serving as the measurement target without cutting off power supply thereto. The present invention is not limited, however, in this way. For example, when the subsequent print job serving as the measurement target is not input from the image processing apparatus 101 for a long period of time, the states of the image forming apparatus 100 and the sensor 217 may change with time. In view of this, power supply to the sensor 217 may be temporarily stopped to place the sensor 217 out of operation. The image forming apparatus 100 may include a timer that measures a waiting period until the input of the subsequent print job serving as the measurement target, and the user may be allowed to set the waiting period via the console unit 214.

Conversely, there may be a case in which it is preferable to forcibly perform the preparation operations for the sensor 217 when the states of the image forming apparatus 100 and the sensor 217 have changed with time. In this case, one print job serving as a measurement target is divided into two or more print jobs serving as measurement targets, and "use inline sensor" in the print job completion information of each print job serving as the measurement target is set to indicate "end." Accordingly, in connection with the print jobs serving as the measurement targets, the operation of the sensor 217 can be ended by stopping power supply to the sensor 217 on a per-job basis. Thus, the preparation operations for the sensor 217 can be executed each time a print job serving as a measurement target is input.

Furthermore, in the case of a print job serving as a measurement target, the image processing apparatus 101 issues an advance notification indicating that a subsequent print job also serves as the measurement target to the image forming apparatus 100 upon completion of the currently executed print job serving as the measurement target. When it is determined that the subsequent print job also serves as the measurement target based on this notification, the sensor 217 can be kept in operation for the subsequent print job without stopping power supply to the sensor 217. As a result, the frequency of the pre-measurement preparation operations for the sensor 217, which are performed on a per-job basis in connection with print jobs serving as measurement targets, can be kept at the minimum required level, and a reduction in the productivity and deterioration in operating components can be prevented.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A print system including an image processing apparatus and a print apparatus that receives a print job processed by the image processing apparatus and prints an image on a sheet,
    wherein the print apparatus comprises:
        (A) a sensor configured to measure a patch image printed on a sheet that is placed on a paper conveyance path between a fixing device and a paper discharge outlet in the print apparatus;
        (B) one or more first memories storing instructions; and
        (C) one or more first processors that execute the instructions:
            (a) to determine, based on an attribute of a print job received from the image processing apparatus, whether or not the received print job is a print job of a first type for printing the patch image to be measured by the sensor;
            (b) in a case in which it is determined that the received print job is the print job of the first type, (i) to execute print processing according to the determined print job of the first type to print the patch image on a sheet, (ii) to cause the sensor to measure the patch image printed on the sheet, and (iii) to discharge the sheet, on which the patch image has been measured, via the paper discharge outlet; and
            (c) in a case in which it is determined that the received print job is a print job of a second type that is different from the print job of the first type, to execute print processing according to the print job of the second type; and
            (d) to transmit a result of the measurement of the patch image to the image processing apparatus, and
    wherein the image processing apparatus comprises:
        (A) a second memory storing instructions; and
        (B) one or more second processors that execute the instructions:
            (a) to generate the print job of the type having the attribute;
            (b) to transmit the generated print job of the first type, generated by the generation unit, to the print apparatus;
            (c) to receive the result of the measurement transmitted by the first transmission unit from the printing apparatus;
            (d) to generate calibration data for adjusting an image to be printed by the print apparatus based on the received result of the measurement, and to apply the calibration data to the print job of the second type for printing an image using the print apparatus; and
            (e) to transmit the print job the second type to the print apparatus.

2. The print system according to claim 1, wherein, when transmitting the generated print job of the first type, the one or more second processors append, to the generated print job of the first type, the attribute indicating that the generated print job of the first type is the print job of the first type, and transmit the generated print job of the first type with the attribute appended thereto.

3. The print system according to claim 1, wherein, when applying the calibration data to the print job of the second type, the one or more second processors adjust image data included in the print job of the second type to be transmitted to the print apparatus using the calibration data.

4. The print system according to claim 1, wherein the one or more first processors further execute the instructions:
    (e) to generate the calibration data for image adjustment based on the result of the measurement, and to transmit the calibration data to the image processing apparatus.

5. The print system according to claim 1, wherein the sensor includes a spectral sensor that is placed on the paper conveyance path between the fixing device and the paper discharge outlet, and the spectral sensor measures chromaticity values of the patch image.

6. The print system according to claim 5, wherein, when it is determined that the received print job is the print job of the first type, the one or more first processors execute the instructions:
    (e) to determine whether or not the spectral sensor is in operation;
    (f) if it is determined that the spectral sensor is in operation, to cause the sensor to perform the measurement; and
    (g) if the spectral sensor is not determined to be in operation, to cause the sensor to perform the measurement after a preparation operation for the spectral sensor has been performed.

7. The print system according to claim 5, wherein the one or more second processors further execute the instructions:
    (f) to issue a job completion notification including information indicating whether or not a print job follows the print job of the first type; and
    (g) to control operations of the spectral sensor based on the information included in the job completion notification.

8. The print system according to claim 1, wherein, when generating the print job of the first type, the one or more second processors generate the print job of the first type in response to an instruction from an application executed on the image processing apparatus, and, when applying the calibration data to the print job of the second type, the one or more second processors apply the calibration data when the print job of the second type is generated by way of the application.

9. The print system according to claim 1, wherein, when transmitting the generated print job of the first type, the one or more second processors append, to the generated print job of the first type, the attribute indicating that the generated print job of the first type is the print job of the first type, and transmit the generated print job of the first type with the attribute appended thereto, and wherein the print job of the first type causes a chart, including an array of a plurality of patch images, to be printed on one sheet.

10. The print system according to claim 9, wherein the attribute includes information of a type of the chart corresponding to a type and functions of the image processing apparatus, and the one or more first processors control the measurement performed by the sensor based on the information of the type of the chart.

11. The print system according to claim 10, wherein the information of the type of the chart includes a type of the result of the measurement and a number of patch images to be printed by executing the print job of the first type.

12. The print system according to claim 1, wherein the one or more first processors further execute the instructions:
   (e) to determine, at a timing of one of (i) after the print job of the first type has been received, and when the print job of the second type that is received while execution of the print job of the first type is on standby, and (ii) during execution of the print job of the first type, whether or not the print job of the second type is affected by the execution of the print job of the first type,
   and, if it is determined that the print job of the second type is affected by the execution of the print job of the first type, the one or more first processors further execute the instructions:
   (f) to cancel the print job of the second type;
   (g) to issue a notification of the cancellation to the image processing apparatus; and
   (h) to execute the print job of the first type.

13. The print system according to claim 12, wherein, upon receiving the result of the measurement transmitted from the print apparatus after the notification, the one or more second processors further apply the calibration data to the cancelled print job of the second type, and transmit the print job of the second type, to which the calibration data has been applied, to the print apparatus.

14. The print system according to claim 1, wherein, in a case in which it is determined that the print job received from the image processing unit is not the print job of the first type, the one or more first processors do not cause the sensor to measure an image on the sheet having been printed according to the print job, and perform control to discharge the sheet, on which the image has been printed, via the paper discharge outlet.

15. A print apparatus that receives a print job processed by an image processing apparatus and prints an image on a sheet, the print apparatus comprising:
   (A) a sensor configured to measure a patch image printed on a sheet that is placed on a paper conveyance path between a fixing device and a paper discharge outlet in the print apparatus;
   (B) one or more memories storing instructions; and
   (C) one or more processors that execute the instructions:
      (a) to determine, based on an attribute of a print job received from the image processing apparatus, whether or not the print job received from the image processing apparatus is a print job of the first type for printing the patch image to be measured by the sensor;
      (b) in a case in which it is determined that the received print job is the print job of the first type, (i) to execute print processing according to the print of the first type job to print the patch image on a sheet, (ii) to cause the sensor to measure the patch image printed on the sheet, and (iii) to discharge the sheet, on which the patch image has been measured, via the paper discharge outlet;
      (c) in a case in which it is determined that the received print job is a print job of a second type that is different from the print job of the first type, to execute print processing according to the print job of the second type; and
      (d) to transmit a result of the measurement of the patch image to the image processing apparatus,
   wherein calibration data for adjusting an image to be printed by the print apparatus is generated based on the result of the measurement and is applied to a print job of the second type by the image processing apparatus.

16. The print apparatus according to claim 15, wherein the sensor includes a spectral sensor that is placed on the paper conveyance path between the fixing device and the paper discharge outlet, and the spectral sensor measures chromaticity values of the patch image.

17. The print apparatus according to claim 15, wherein the print job of the first type causes a chart, including an array of a plurality of patch images, to be printed on one sheet.

18. The print apparatus according to claim 15, wherein, in a case in which it is determined that the print job received from the image processing unit is not the print job of the first type, the one or more first processors do not cause the sensor to measure the image on the sheet having been printed according to the print job, and perform control to discharge the sheet, on which the image has been printed, via the paper discharge outlet.

19. A method of controlling a print system that includes an image processing apparatus and a print apparatus that receives a print job processed by the image processing apparatus and prints an image on a sheet, the method comprising the steps of:
   (A) in the print apparatus,
      (a) measuring a patch image printed on a sheet using a spectral sensor that is placed on a paper conveyance path between a fixing device and a paper discharge outlet in the print apparatus;
      (b) determining, based on an attribute of a print job received from the image processing apparatus, whether or not the print job received from the image processing apparatus is a print job of a first type for printing the patch image to be measured in the measuring step;
      (c) in a case in which it is determined that the received print job is the print job of the first type, (i) executing print processing according to the print job of the first type to print the patch image on a sheet, (ii) causing the spectral sensor to measure the patch image on the sheet, and (iii) discharging the sheet, on which the patch image has been measured, via the paper discharge outlet;
      (d) in a case in which it is determined that the received print job is a print job of a second type that is different from the print job of the first type, to execute print processing according to the print job of the second type;
      (e) performing a first transmission to transmit a result of the measurement of the patch image to the image processing apparatus, and
   (B) in the image processing apparatus,
      (a) generating the print job of the first type having the attribute;
      (b) performing a second transmission to transmit the print job of the first type, generated in the generating step, to the print apparatus;
      (c) receiving the result of the measurement from the print apparatus;

(d) generating calibration data for adjusting an image to be printed by the print apparatus based on the received result of the measurement, and applying the calibration data to the print job of the second type; and (e) transmitting the print job of the second type to the print apparatus.

20. A method of controlling a print apparatus that receives a print job processed by an image processing apparatus and prints an image on a sheet, the method comprising the steps of:

(A) measuring a patch image printed on a sheet using a spectral sensor that is placed on a paper conveyance path between a fixing device and a paper discharge outlet in the print apparatus;

(B) determining, based on an attribute of a print job received from the image processing apparatus, whether or not the print job received from the image processing apparatus is a print job of the first type for printing the patch image to be measured in the measuring step;

(C) in a case in which it is determined that the received print job is the print job of the first type, (a) executing print processing according to the print job of the first type to print the patch image on a sheet, (b) measuring the patch image printed on the sheet, and (c) discharging the sheet, on which the patch image has been measured, via the paper discharge outlet;

(D) in a case in which it is determined that the print job is a print job of a second type that is different from the print job of the first type, to execute print processing according to the print job of the second type; and (E) transmitting a result of the measurement of the patch image to the image processing apparatus, wherein calibration data for adjusting an image to be printed by the print apparatus is generated based on the result of the measurement and is applied to a print job of the second type by the image processing apparatus.

21. A non-transitory computer-readable storage medium storing a program for causing a processor to execute a method of controlling a print apparatus that receives a print job processed by an image processing apparatus and prints an image on a sheet, the method comprising the steps of:

(A) measuring a patch image printed on a sheet using a spectral sensor that is placed on a paper conveyance path between a fixing device and a paper discharge outlet in the print apparatus;

(B) determining, based on an attribute of a print job received from the image processing apparatus, whether or not the print job received from the image processing apparatus is a print job of a first type for printing the patch image to be measured in the measuring step;

(C) in a case in which it is determined that the received print job is the print job of the first type, (a) executing print processing according to the print job of the first type to print the patch image on a sheet, (b) measuring the patch image printed on the sheet, and (c) discharging the sheet, on which the patch image has been measured, via the paper discharge outlet;

(D) in a case in which it is determined that the received print job is a print job of a second type that is different from the print job of the first type, to execute print processing according to the print job of the second type; and (E) transmitting a result of the measurement of the patch image to the image processing apparatus, wherein calibration data for adjusting an image to be printed by the print apparatus is generated based on the result of the measurement and is applied to a print job of the second type by the image processing apparatus.

* * * * *